US008830255B2

(12) United States Patent
Irie et al.

(10) Patent No.: US 8,830,255 B2
(45) Date of Patent: Sep. 9, 2014

(54) DISPLAY DEVICE AND METHOD FOR DRIVING DISPLAY DEVICE

(75) Inventors: Kentaroh Irie, Osaka (JP); Masae Kawabata, Osaka (JP); Fumikazu Shimoshikiryoh, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 329 days.

(21) Appl. No.: 13/509,965

(22) PCT Filed: Jul. 29, 2010

(86) PCT No.: PCT/JP2010/062803

§ 371 (c)(1), (2), (4) Date: May 15, 2012

(87) PCT Pub. No.: WO2011/065064

PCT Pub. Date: Jun. 3, 2011

(65) Prior Publication Data

US 2012/0223958 A1 Sep. 6, 2012

(30) Foreign Application Priority Data

Nov. 27, 2009 (JP) ................................ 2009-270817

(51) Int. Cl.
*G09G 3/36* (2006.01)
*G02F 1/13* (2006.01)
*G09G 3/20* (2006.01)

(52) U.S. Cl.
CPC ...... *G09G 3/3648* (2013.01); *G09G 2320/0276* (2013.01); *G09G 2320/0261* (2013.01); *G09G 2320/0673* (2013.01); *G09G 3/2025* (2013.01)
USPC ................. 345/589; 345/89; 345/92; 345/94; 345/690; 382/254; 382/232

(58) Field of Classification Search
None
See application file for complete search history.

(56) References Cited

U.S. PATENT DOCUMENTS

| | | | | |
|---|---|---|---|---|
| 5,847,688 | A | 12/1998 | Ohi et al. | |
| 6,172,662 | B1 * | 1/2001 | Ito et al. .......................... | 345/94 |
| 2004/0239698 | A1 | 12/2004 | Kamada et al. | |
| 2004/0257325 | A1 | 12/2004 | Inoue | |
| 2006/0198009 | A1 | 9/2006 | Morita | |
| 2007/0013633 | A1 | 1/2007 | Kamada et al. | |

FOREIGN PATENT DOCUMENTS

| | | |
|---|---|---|
| JP | 7-121144 | 5/1995 |
| JP | 9-237060 | 9/1997 |
| JP | 2004-302270 | 10/2004 |
| JP | 2004-309843 | 11/2004 |
| JP | 2005-10520 | 1/2005 |
| JP | 2006-184516 | 7/2006 |
| JP | 2006-243232 | 9/2006 |

OTHER PUBLICATIONS

Search Report mailed Aug. 31, 2010, directed to International Application No. PCT/JP2010/062803; 4 pages.

* cited by examiner

*Primary Examiner* — Ulka Chauhan
*Assistant Examiner* — Sultana M Zalalee
(74) *Attorney, Agent, or Firm* — Morrison & Foerster LLP

(57) ABSTRACT

The present invention provides a display device which is arranged so that when an image is scrolled, a noise pattern does not easily overlap the image. The display device includes a display region that includes a region in which an arrangement pattern (U1) including X i-th pixels arranged next to one another in the row direction for each data color, the arrangement pattern being repeated in the row direction, the X being represented by $$X=A/2+A\cdot Q,$$

where Q is an integer of 0 or greater, and is defined for each row.

34 Claims, 37 Drawing Sheets

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 0 | 2 | 2 | 0 | 2 | 2 |
| Total | 3 | 3 | 3 | 3 | 6 | 6 |

P2

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 3 | 3 | 3 | 3 | 6 | 6 |

P3

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 2 | 0 | 0 | 2 | 2 | 2 |
| Total | 3 | 3 | 3 | 3 | 6 | 6 |

P4

| | α | | β | | α+β | |
|---|---|---|---|---|---|---|
| | Y1 | Y2 | Y1 | Y2 | Y1 | Y2 |
| S1 | 0 | 2 | 2 | 0 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 1 | 5 | 5 | 1 | 6 | 6 |

P5

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

P6

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 2 | 0 | 0 | 2 | 2 | 2 |
| S4 | 1 | 1 | 1 | 1 | 2 | 2 |
| Total | 5 | 1 | 1 | 5 | 6 | 6 |

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 2 | 0 | 0 | 2 | 2 | 2 |
| Total | 3 | 3 | 3 | 3 | 6 | 6 |

P2

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

P3

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

P4

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 0 | 2 | 2 | 0 | 2 | 2 |
| Total | 3 | 3 | 3 | 3 | 6 | 6 |

P5

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 0 | 2 | 2 | 0 | 2 | 2 |
| Total | 3 | 3 | 3 | 3 | 6 | 6 |

P6

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 2 | 0 | 0 | 2 | 2 | 2 |
| Total | 3 | 3 | 3 | 3 | 6 | 6 |

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 2 | 1 | 1 | 2 | 3 | 3 |
| S2 | 0 | 0 | 0 | 0 | 0 | 0 |
| S3 | 0 | 0 | 0 | 0 | 0 | 0 |
| S4 | 2 | 1 | 1 | 2 | 3 | 3 |
| Total | 4 | 2 | 2 | 4 | 6 | 6 |

P2

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 1 | 2 | 2 | 1 | 3 | 3 |
| S4 | 2 | 1 | 1 | 2 | 3 | 3 |
| Total | 3 | 3 | 3 | 3 | 6 | 6 |

P3

| | α | | β | | α+β | |
|---|---|---|---|---|---|---|
| | Y1 | Y2 | Y1 | Y2 | Y1 | Y2 |
| S1 | 2 | 1 | 1 | 2 | 3 | 3 |
| S2 | 0 | 0 | 0 | 0 | 0 | 0 |
| S3 | 1 | 2 | 2 | 1 | 3 | 3 |
| S4 | 0 | 0 | 0 | 0 | 0 | 0 |
| Total | 3 | 3 | 3 | 3 | 6 | 6 |

P4

| | α | | β | | α+β | |
|---|---|---|---|---|---|---|
| | Y1 | Y2 | Y1 | Y2 | Y1 | Y2 |
| S1 | 2 | 1 | 1 | 2 | 3 | 3 |
| S2 | 0 | 0 | 0 | 0 | 0 | 0 |
| S3 | 0 | 0 | 0 | 0 | 0 | 0 |
| S4 | 1 | 2 | 2 | 1 | 3 | 3 |
| Total | 3 | 3 | 3 | 3 | 6 | 6 |

P5

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 1 | 2 | 2 | 1 | 3 | 3 |
| S4 | 1 | 2 | 2 | 1 | 3 | 3 |
| Total | 2 | 4 | 4 | 2 | 6 | 6 |

P6

| | α | | β | | α+β | |
|---|---|---|---|---|---|---|
| | Y1 | Y2 | Y1 | Y2 | Y1 | Y2 |
| S1 | 2 | 1 | 1 | 2 | 3 | 3 |
| S2 | 0 | 0 | 0 | 0 | 0 | 0 |
| S3 | 1 | 2 | 2 | 1 | 3 | 3 |
| S4 | 0 | 0 | 0 | 0 | 0 | 0 |
| Total | 3 | 3 | 3 | 3 | 6 | 6 |

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

P2

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 2 | 0 | 0 | 2 | 2 | 2 |
| Total | 5 | 1 | 1 | 5 | 6 | 6 |

P3

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 2 | 0 | 0 | 2 | 2 | 2 |
| Total | 5 | 1 | 1 | 5 | 6 | 6 |

P4

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 0 | 2 | 2 | 0 | 2 | 2 |
| Total | 1 | 5 | 5 | 1 | 6 | 6 |

P5

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 0 | 2 | 2 | 0 | 2 | 2 |
| Total | 1 | 5 | 5 | 1 | 6 | 6 |

P6

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 3 | 3 | 3 | 3 | 6 | 6 |

P2

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 0 | 2 | 2 | 0 | 2 | 2 |
| Total | 1 | 5 | 5 | 1 | 6 | 6 |

P3

| | α | | β | | α+β | |
|---|---|---|---|---|---|---|
| | Y1 | Y2 | Y1 | Y2 | Y1 | Y2 |
| S1 | 0 | 2 | 2 | 0 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 1 | 5 | 5 | 1 | 6 | 6 |

P4

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |

P5

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 2 | 0 | 0 | 2 | 2 | 2 |
| S4 | 1 | 1 | 1 | 1 | 2 | 2 |
| Total | 5 | 1 | 1 | 5 | 6 | 6 |

P6

| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 2 | 0 | 0 | 2 | 2 | 2 |
| Total | 5 | 1 | 1 | 5 | 6 | 6 |

Number Of Frames For Respective Luminance Levels

P1

| | α | | β | | α+β | |
|---|---|---|---|---|---|---|
| | Y1 | Y2 | Y1 | Y2 | Y1 | Y2 |
| S1 | 4 | 2 | 2 | 4 | 6 | 6 |
| S2 | 0 | 0 | 0 | 0 | 0 | 0 |
| S3 | 0 | 0 | 0 | 0 | 0 | 0 |
| S4 | 0 | 0 | 0 | 0 | 0 | 0 |
| Total | 4 | 2 | 2 | 4 | 6 | 6 |

P2

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 2 | 4 | 4 | 2 | 6 | 6 |
| S4 | 0 | 0 | 0 | 0 | 0 | 0 |
| Total | 2 | 4 | 4 | 2 | 6 | 6 |

P3

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 2 | 4 | 4 | 2 | 6 | 6 |
| S4 | 0 | 0 | 0 | 0 | 0 | 0 |
| Total | 2 | 4 | 4 | 2 | 6 | 6 |

P4

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 0 | 0 | 0 | 0 | 0 | 0 |
| S4 | 3 | 3 | 3 | 3 | 6 | 6 |
| Total | 3 | 3 | 3 | 3 | 6 | 6 |

P5

| | α | | β | | α+β | |
|---|---|---|---|---|---|---|
| | Y1 | Y2 | Y1 | Y2 | Y1 | Y2 |
| S1 | 0 | 0 | 0 | 0 | 0 | 0 |
| S2 | 0 | 0 | 0 | 0 | 0 | 0 |
| S3 | 0 | 0 | 0 | 0 | 0 | 0 |
| S4 | 3 | 3 | 3 | 3 | 6 | 6 |
| Total | 3 | 3 | 3 | 3 | 6 | 6 |

P6

| | α | | β | | α+β | |
|---|---|---|---|---|---|---|
| | Y1 | Y2 | Y1 | Y2 | Y1 | Y2 |
| S1 | 4 | 2 | 4 | 2 | 8 | 4 |
| S2 | 0 | 0 | 0 | 0 | 0 | 0 |
| S3 | 0 | 0 | 0 | 0 | 0 | 0 |
| S4 | 0 | 0 | 0 | 0 | 0 | 0 |
| Total | 4 | 2 | 4 | 2 | 8 | 4 |

FIG. 16
Pixels At Visual Point | 7dot/Frame Scroll (With Same Sequence Order As 1dot/Frame)
P1
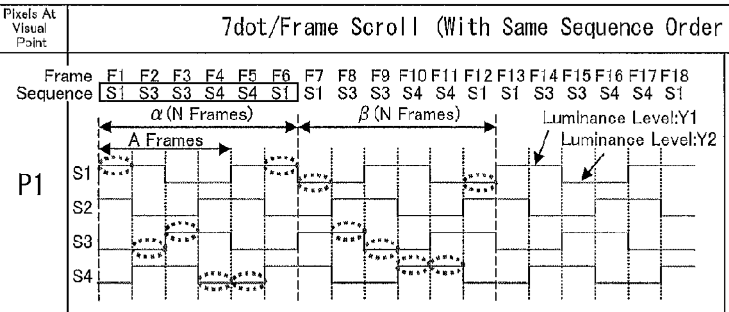
Number Of Frames For Respective Luminance Levels
| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 1 | 1 | 1 | 1 | 2 | 2 |
| S4 | 0 | 2 | 2 | 0 | 2 | 2 |
| Total | 3 | 3 | 3 | 3 | 6 | 6 |
P2
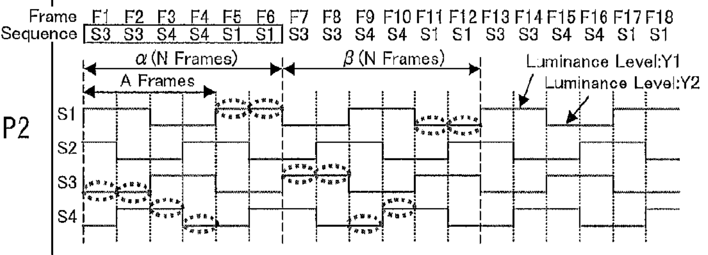
| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 3 | 3 | 3 | 3 | 6 | 6 |
P3
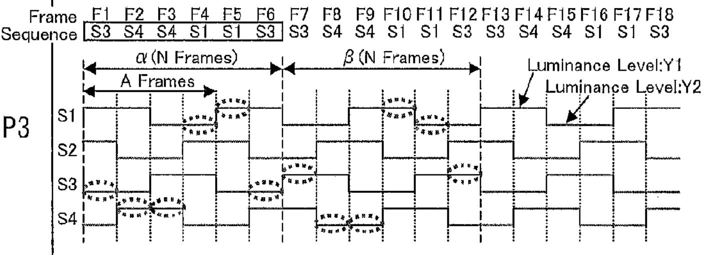
| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 0 | 2 | 2 | 0 | 2 | 2 |
| S4 | 2 | 0 | 0 | 2 | 2 | 2 |
| Total | 3 | 3 | 3 | 3 | 6 | 6 |
P4
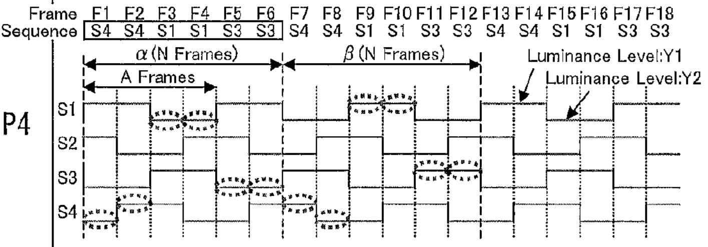
| | α | | β | | α+β | |
|---|---|---|---|---|---|---|
| | Y1 | Y2 | Y1 | Y2 | Y1 | Y2 |
| S1 | 0 | 2 | 2 | 0 | 2 | 2 |
| S2 | 0 | 0 | 0 | 0 | 0 | 0 |
| S3 | 0 | 2 | 2 | 0 | 2 | 2 |
| S4 | 1 | 1 | 1 | 1 | 2 | 2 |
| Total | 1 | 5 | 5 | 1 | 6 | 6 |
P5
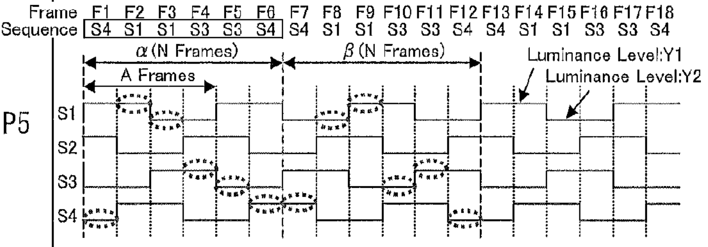
| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 0 | 0 | 0 | 0 | 0 | 0 |
| S3 | 1 | 1 | 1 | 1 | 2 | 2 |
| S4 | 1 | 1 | 1 | 1 | 2 | 2 |
| Total | 3 | 3 | 3 | 3 | 6 | 6 |
P6
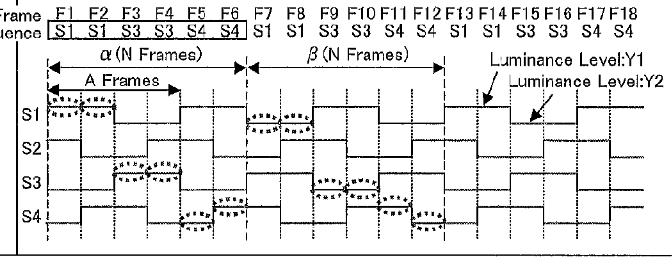
| | α | | β | | α+β | |
|---|---|---|---|---|---|---|
| | Y1 | Y2 | Y1 | Y2 | Y1 | Y2 |
| S1 | 2 | 0 | 0 | 2 | 2 | 2 |
| S2 | 0 | 0 | 0 | 0 | 0 | 0 |
| S3 | 2 | 0 | 0 | 2 | 2 | 2 |
| S4 | 1 | 1 | 1 | 1 | 2 | 2 |
| Total | 5 | 1 | 1 | 5 | 6 | 6 |

P1

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 1 | 1 | 1 | 1 | 2 | 2 |
| Total | 2 | 2 | 2 | 2 | 4 | 4 |

P2

| | α | | β | | α+β | |
|---|---|---|---|---|---|---|
| | Y1 | Y2 | Y1 | Y2 | Y1 | Y2 |
| S1 | 2 | 0 | 2 | 0 | 4 | 0 |
| S2 | 2 | 0 | 2 | 0 | 4 | 0 |
| Total | 4 | 0 | 4 | 0 | 8 | 0 |

P3

| | α | | β | | α+β | |
|---|---|---|---|---|---|---|
| | Y1 | Y2 | Y1 | Y2 | Y1 | Y2 |
| S1 | 1 | 1 | 1 | 1 | 2 | 2 |
| S2 | 1 | 1 | 1 | 1 | 2 | 2 |
| Total | 2 | 2 | 2 | 2 | 4 | 4 |

P4

| | α | | β | | α+β | |
|---|---|---|---|---|---|---|
| | Y1 | Y2 | Y1 | Y2 | Y1 | Y2 |
| S1 | 0 | 2 | 0 | 2 | 0 | 4 |
| S2 | 0 | 2 | 0 | 2 | 0 | 4 |
| Total | 0 | 4 | 0 | 4 | 0 | 8 |

FIG. 23

| Input 10bit | A | B | C | D |
|---|---|---|---|---|
| 0 | 0 | 0 | 0 | 0 |
| 1 | 5 | 5 | 8 | 8 |
| 2 | 12 | 12 | 15 | 15 |
| 3 | 16 | 16 | 17 | 17 |
| 4 | 18 | 18 | 20 | 20 |
| 5 | 21 | 21 | 23 | 23 |
| 6 | 24 | 24 | 27 | 27 |
| 7 | 26 | 26 | 29 | 29 |
| 8 | 28 | 28 | 30 | 30 |
| 9 | 30 | 30 | 32 | 32 |
| 10 | 32 | 32 | 33 | 32 |
| 11 | 34 | 32 | 36 | 33 |
| 12 | 35 | 32 | 37 | 33 |
| 13 | 36 | 32 | 40 | 33 |
| 14 | 38 | 32 | 44 | 33 |
| 15 | 40 | 32 | 47 | 34 |
| ⋮ | ⋮ | ⋮ | ⋮ | ⋮ |
| 507 | 761 | 86 | 647 | 411 |
| 508 | 763 | 87 | 649 | 413 |
| 509 | 764 | 87 | 650 | 414 |
| 510 | 764 | 87 | 651 | 414 |
| 511 | 765 | 88 | 652 | 415 |
| 512 | 766 | 88 | 653 | 416 |
| 513 | 766 | 88 | 654 | 417 |
| 514 | 767 | 89 | 655 | 418 |
| 515 | 768 | 89 | 657 | 419 |
| 516 | 769 | 89 | 658 | 420 |
| 517 | 770 | 90 | 660 | 422 |
| ⋮ | ⋮ | ⋮ | ⋮ | ⋮ |
| 1010 | 1017 | 968 | 992 | 989 |
| 1011 | 1017 | 971 | 993 | 990 |
| 1012 | 1017 | 975 | 995 | 993 |
| 1013 | 1018 | 979 | 998 | 995 |
| 1014 | 1018 | 982 | 1000 | 998 |
| 1015 | 1019 | 986 | 1002 | 1000 |
| 1016 | 1019 | 989 | 1003 | 1001 |
| 1017 | 1019 | 992 | 1005 | 1003 |
| 1018 | 1020 | 996 | 1008 | 1006 |
| 1019 | 1020 | 1000 | 1010 | 1009 |
| 1020 | 1021 | 1004 | 1012 | 1011 |
| 1021 | 1021 | 1009 | 1016 | 1015 |
| 1022 | 1022 | 1013 | 1018 | 1017 |
| 1023 | 1023 | 1023 | 1023 | 1023 |

FIG. 24

| Input 10bit | A | B | C | D |
|---|---|---|---|---|
| 0 | 0 | 0 | 0 | 0 |
| 1 | 1 | 1 | 1 | 0 |
| 2 | 4 | 4 | 4 | 0 |
| 3 | 17 | 17 | 17 | 0 |
| 4 | 19 | 19 | 19 | 0 |
| 5 | 22 | 22 | 22 | 0 |
| 6 | 25 | 25 | 25 | 0 |
| 7 | 26 | 26 | 26 | 0 |
| 8 | 28 | 28 | 28 | 0 |
| 9 | 30 | 30 | 30 | 0 |
| 10 | 32 | 32 | 33 | 0 |
| 11 | 33 | 32 | 43 | 0 |
| 12 | 33 | 32 | 54 | 0 |
| 13 | 34 | 32 | 65 | 0 |
| 14 | 35 | 32 | 71 | 0 |
| 15 | 35 | 32 | 77 | 0 |
| ⋮ | ⋮ | ⋮ | ⋮ | ⋮ |
| 507 | 732 | 32 | 867 | 0 |
| 508 | 733 | 32 | 867 | 0 |
| 509 | 734 | 32 | 867 | 0 |
| 510 | 735 | 32 | 868 | 0 |
| 511 | 736 | 32 | 868 | 0 |
| 512 | 737 | 32 | 869 | 0 |
| 513 | 738 | 32 | 869 | 0 |
| 514 | 739 | 32 | 870 | 0 |
| 515 | 740 | 32 | 870 | 0 |
| 516 | 741 | 32 | 871 | 0 |
| 517 | 742 | 32 | 871 | 0 |
| ⋮ | ⋮ | ⋮ | ⋮ | ⋮ |
| 1010 | 1022 | 970 | 1022 | 969 |
| 1011 | 1022 | 973 | 1022 | 972 |
| 1012 | 1022 | 976 | 1022 | 975 |
| 1013 | 1022 | 979 | 1022 | 978 |
| 1014 | 1022 | 982 | 1022 | 981 |
| 1015 | 1022 | 986 | 1022 | 985 |
| 1016 | 1022 | 990 | 1022 | 990 |
| 1017 | 1022 | 995 | 1022 | 995 |
| 1018 | 1023 | 999 | 1023 | 999 |
| 1019 | 1023 | 1004 | 1023 | 1004 |
| 1020 | 1023 | 1009 | 1023 | 1009 |
| 1021 | 1023 | 1013 | 1023 | 1013 |
| 1022 | 1023 | 1018 | 1023 | 1018 |
| 1023 | 1023 | 1023 | 1023 | 1023 |

FIG. 27

| | |
|---|---|
| Frame Cycle A | 4 Frames |
| Q1 | 1 |
| Q2 | 0 |
| Row (Horizontal) Arrangement Cycle N=A/2+A·Q1 | 6 (Same Among RGB)/2 (Different Among RGB) |
| Column (Vertical) Arrangement Cycle M=A/2+A·Q2 | 2 |
| Driving Frequency | 120Hz |
| Bright-Dark Switching Cycle | 30Hz |

Arrangement (Same Among RGB)

N=6

M=2

| R | G | B | R | G | B | R | G | B | R | G | B | R | G | B | R | G | B |
|---|---|---|---|---|---|---|---|---|---|---|---|---|---|---|---|---|---|
| S1 | S1 | S1 | S3 | S3 | S3 | S3 | S3 | S3 | S4 | S4 | S4 | S4 | S4 | S4 | S1 | S1 | S1 |
| S3 | S3 | S3 | S1 | S1 | S1 | S1 | S1 | S1 | S2 | S2 | S2 | S2 | S2 | S2 | S3 | S3 | S3 |
| S1 | S1 | S1 | S3 | S3 | S3 | S3 | S3 | S3 | S4 | S4 | S4 | S4 | S4 | S4 | S1 | S1 | S1 |
| S3 | S3 | S3 | S1 | S1 | S1 | S1 | S1 | S1 | S2 | S2 | S2 | S2 | S2 | S2 | S3 | S3 | S3 |
| S1 | S1 | S1 | S3 | S3 | S3 | S3 | S3 | S3 | S4 | S4 | S4 | S4 | S4 | S4 | S1 | S1 | S1 |
| S3 | S3 | S3 | S1 | S1 | S1 | S1 | S1 | S1 | S2 | S2 | S2 | S2 | S2 | S2 | S3 | S3 | S3 |
| S1 | S1 | S1 | S3 | S3 | S3 | S3 | S3 | S3 | S4 | S4 | S4 | S4 | S4 | S4 | S1 | S1 | S1 |
| S3 | S3 | S3 | S1 | S1 | S1 | S1 | S1 | S1 | S2 | S2 | S2 | S2 | S2 | S2 | S3 | S3 | S3 |

Arrangement (Different Among RGB)

N=2

M=2

| R | G | B | R | G | B | R | G | B | R | G | B | R | G | B | R | G | B |
|---|---|---|---|---|---|---|---|---|---|---|---|---|---|---|---|---|---|
| S1 | S3 | S3 | S4 | S4 | S1 | S1 | S3 | S3 | S4 | S4 | S1 | S1 | S3 | S3 | S4 | S4 | S1 |
| S3 | S1 | S1 | S2 | S2 | S3 | S3 | S1 | S1 | S2 | S2 | S3 | S3 | S1 | S1 | S2 | S2 | S3 |
| S1 | S3 | S3 | S4 | S4 | S1 | S1 | S3 | S3 | S4 | S4 | S1 | S1 | S3 | S3 | S4 | S4 | S1 |
| S3 | S1 | S1 | S2 | S2 | S3 | S3 | S1 | S1 | S2 | S2 | S3 | S3 | S1 | S1 | S2 | S2 | S3 |
| S1 | S3 | S3 | S4 | S4 | S1 | S1 | S3 | S3 | S4 | S4 | S1 | S1 | S3 | S3 | S4 | S4 | S1 |
| S3 | S1 | S1 | S2 | S2 | S3 | S3 | S1 | S1 | S2 | S2 | S3 | S3 | S1 | S1 | S2 | S2 | S3 |
| S1 | S3 | S3 | S4 | S4 | S1 | S1 | S3 | S3 | S4 | S4 | S1 | S1 | S3 | S3 | S4 | S4 | S1 |
| S3 | S1 | S1 | S2 | S2 | S3 | S3 | S1 | S1 | S2 | S2 | S3 | S3 | S1 | S1 | S2 | S2 | S3 |

FIG. 29

| Frame Cycle A | 4 Frames |
|---|---|
| Q1 | 0 |
| Q2 | 0 |
| Row (Horizontal) Arrangement Cycle N=A/2+A·Q1 | 2 |
| Column (Vertical) Arrangement Cycle M=A/2+A·Q2 | 2 |
| Driving Frequency | 120Hz |
| Bright-Dark Switching Cycle | 30Hz |

Arrangement (Same Among RGB)

N=2

M=2

| R | G | B | R | G | B | R | G | B | R | G | B | R | G | B | R | G | B |
|---|---|---|---|---|---|---|---|---|---|---|---|---|---|---|---|---|---|
| S1 | S1 | S1 | S2 | S2 | S2 | S1 | S1 | S1 | S2 | S2 | S2 | S1 | S1 | S1 | S2 | S2 | S2 |
| S2 | S2 | S2 | S1 | S1 | S1 | S2 | S2 | S2 | S1 | S1 | S1 | S2 | S2 | S2 | S1 | S1 | S1 |
| S1 | S1 | S1 | S2 | S2 | S2 | S1 | S1 | S1 | S2 | S2 | S2 | S1 | S1 | S1 | S2 | S2 | S2 |
| S2 | S2 | S2 | S1 | S1 | S1 | S2 | S2 | S2 | S1 | S1 | S1 | S2 | S2 | S2 | S1 | S1 | S1 |
| S1 | S1 | S1 | S2 | S2 | S2 | S1 | S1 | S1 | S2 | S2 | S2 | S1 | S1 | S1 | S2 | S2 | S2 |
| S2 | S2 | S2 | S1 | S1 | S1 | S2 | S2 | S2 | S1 | S1 | S1 | S2 | S2 | S2 | S1 | S1 | S1 |
| S1 | S1 | S1 | S2 | S2 | S2 | S1 | S1 | S1 | S2 | S2 | S2 | S1 | S1 | S1 | S2 | S2 | S2 |
| S2 | S2 | S2 | S1 | S1 | S1 | S2 | S2 | S2 | S1 | S1 | S1 | S2 | S2 | S2 | S1 | S1 | S1 |

Arrangement (Different Among RGB)

N=2

M=2

| R | G | B | R | G | B | R | G | B | R | G | B | R | G | B | R | G | B |
|---|---|---|---|---|---|---|---|---|---|---|---|---|---|---|---|---|---|
| S1 | S2 | S1 | S2 | S1 | S2 | S1 | S2 | S1 | S2 | S1 | S2 | S1 | S2 | S1 | S2 | S1 | S2 |
| S2 | S1 | S2 | S1 | S2 | S1 | S2 | S1 | S2 | S1 | S2 | S1 | S2 | S1 | S2 | S1 | S2 | S1 |
| S1 | S2 | S1 | S2 | S1 | S2 | S1 | S2 | S1 | S2 | S1 | S2 | S1 | S2 | S1 | S2 | S1 | S2 |
| S2 | S1 | S2 | S1 | S2 | S1 | S2 | S1 | S2 | S1 | S2 | S1 | S2 | S1 | S2 | S1 | S2 | S1 |
| S1 | S2 | S1 | S2 | S1 | S2 | S1 | S2 | S1 | S2 | S1 | S2 | S1 | S2 | S1 | S2 | S1 | S2 |
| S2 | S1 | S2 | S1 | S2 | S1 | S2 | S1 | S2 | S1 | S2 | S1 | S2 | S1 | S2 | S1 | S2 | S1 |
| S1 | S2 | S1 | S2 | S1 | S2 | S1 | S2 | S1 | S2 | S1 | S2 | S1 | S2 | S1 | S2 | S1 | S2 |
| S2 | S1 | S2 | S1 | S2 | S1 | S2 | S1 | S2 | S1 | S2 | S1 | S2 | S1 | S2 | S1 | S2 | S1 |

FIG. 31

| | |
|---|---|
| Frame Cycle A | 8 Frames |
| Q1 | 0 |
| Q2 | 0 |
| Row (Horizontal) Arrangement Cycle N=A/2+A·Q1 | 4 |
| Column (Vertical) Arrangement Cycle M=A/2+A·Q2 | 4 |
| Driving Frequency | 240Hz |
| Bright-Dark Switching Cycle | 30Hz |

Arrangement (Same Among RGB)

N=4

M=4

| R | G | B | R | G | B | R | G | B | R | G | B | R | G | B | R | G | B |
|---|---|---|---|---|---|---|---|---|---|---|---|---|---|---|---|---|---|
| S1 | S1 | S1 | S1 | S1 | S1 | S2 | S2 | S2 | S2 | S2 | S2 | S1 | S1 | S1 | S1 | S1 | S1 |
| S2 | S2 | S2 | S2 | S2 | S2 | S1 | S1 | S1 | S1 | S1 | S1 | S2 | S2 | S2 | S2 | S2 | S2 |
| S1 | S1 | S1 | S1 | S1 | S1 | S2 | S2 | S2 | S2 | S2 | S2 | S1 | S1 | S1 | S1 | S1 | S1 |
| S2 | S2 | S2 | S2 | S2 | S2 | S1 | S1 | S1 | S1 | S1 | S1 | S2 | S2 | S2 | S2 | S2 | S2 |
| S1 | S1 | S1 | S1 | S1 | S1 | S2 | S2 | S2 | S2 | S2 | S2 | S1 | S1 | S1 | S1 | S1 | S1 |
| S2 | S2 | S2 | S2 | S2 | S2 | S1 | S1 | S1 | S1 | S1 | S1 | S2 | S2 | S2 | S2 | S2 | S2 |
| S1 | S1 | S1 | S1 | S1 | S1 | S2 | S2 | S2 | S2 | S2 | S2 | S1 | S1 | S1 | S1 | S1 | S1 |
| S2 | S2 | S2 | S2 | S2 | S2 | S1 | S1 | S1 | S1 | S1 | S1 | S2 | S2 | S2 | S2 | S2 | S2 |

Arrangement (Different Among RGB)

N=4

M=4

| R | G | B | R | G | B | R | G | B | R | G | B | R | G | B | R | G | B |
|---|---|---|---|---|---|---|---|---|---|---|---|---|---|---|---|---|---|
| S1 | S1 | S2 | S2 | S1 | S1 | S2 | S2 | S1 | S1 | S2 | S2 | S1 | S1 | S2 | S2 | S1 | S1 |
| S2 | S2 | S1 | S1 | S2 | S2 | S1 | S1 | S2 | S2 | S1 | S1 | S2 | S2 | S1 | S1 | S2 | S2 |
| S1 | S1 | S2 | S2 | S1 | S1 | S2 | S2 | S1 | S1 | S2 | S2 | S1 | S1 | S2 | S2 | S1 | S1 |
| S2 | S2 | S1 | S1 | S2 | S2 | S1 | S1 | S2 | S2 | S1 | S1 | S2 | S2 | S1 | S1 | S2 | S2 |
| S1 | S1 | S2 | S2 | S1 | S1 | S2 | S2 | S1 | S1 | S2 | S2 | S1 | S1 | S2 | S2 | S1 | S1 |
| S2 | S2 | S1 | S1 | S2 | S2 | S1 | S1 | S2 | S2 | S1 | S1 | S2 | S2 | S1 | S1 | S2 | S2 |
| S1 | S1 | S2 | S2 | S1 | S1 | S2 | S2 | S1 | S1 | S2 | S2 | S1 | S1 | S2 | S2 | S1 | S1 |
| S2 | S2 | S1 | S1 | S2 | S2 | S1 | S1 | S2 | S2 | S1 | S1 | S2 | S2 | S1 | S1 | S2 | S2 |

FIG. 33

| | |
|---|---|
| Frame Cycle A | 8 Frames |
| Q1 | 0 |
| Q2 | 0 |
| Row (Horizontal) Arrangement Cycle N=A/2+A·Q1 | 4 |
| Column (Vertical) Arrangement Cycle M=A/2+A·Q2 | 4 |
| Driving Frequency | 240Hz |
| Bright-Dark Switching Cycle | 30Hz |
| Arrangement (Same Among RGB) | see below |
| Arrangement (Different Among RGB) | see below |

Arrangement (Same Among RGB)

N=4, M=4

| R | G | B | R | G | B | R | G | B | R | G | B | R | G | B | R | G | B |
|---|---|---|---|---|---|---|---|---|---|---|---|---|---|---|---|---|---|
| S1 | S1 | S1 | S2 | S2 | S2 | S3 | S3 | S3 | S4 | S4 | S4 | S1 | S1 | S1 | S2 | S2 | S2 |
| S3 | S3 | S3 | S4 | S4 | S4 | S1 | S1 | S1 | S2 | S2 | S2 | S3 | S3 | S3 | S4 | S4 | S4 |
| S1 | S1 | S1 | S2 | S2 | S2 | S3 | S3 | S3 | S4 | S4 | S4 | S1 | S1 | S1 | S2 | S2 | S2 |
| S3 | S3 | S3 | S4 | S4 | S4 | S1 | S1 | S1 | S2 | S2 | S2 | S3 | S3 | S3 | S4 | S4 | S4 |
| S1 | S1 | S1 | S2 | S2 | S2 | S3 | S3 | S3 | S4 | S4 | S4 | S1 | S1 | S1 | S2 | S2 | S2 |
| S3 | S3 | S3 | S4 | S4 | S4 | S1 | S1 | S1 | S2 | S2 | S2 | S3 | S3 | S3 | S4 | S4 | S4 |
| S1 | S1 | S1 | S2 | S2 | S2 | S3 | S3 | S3 | S4 | S4 | S4 | S1 | S1 | S1 | S2 | S2 | S2 |
| S3 | S3 | S3 | S4 | S4 | S4 | S1 | S1 | S1 | S2 | S2 | S2 | S3 | S3 | S3 | S4 | S4 | S4 |

Arrangement (Different Among RGB)

N=4, M=4

| R | G | B | R | G | B | R | G | B | R | G | B | R | G | B | R | G | B |
|---|---|---|---|---|---|---|---|---|---|---|---|---|---|---|---|---|---|
| S1 | S2 | S3 | S4 | S1 | S2 | S3 | S4 | S1 | S2 | S3 | S4 | S1 | S2 | S3 | S4 | S1 | S2 |
| S3 | S4 | S1 | S2 | S4 | S3 | S4 | S1 | S2 | S4 | S3 | S4 | S1 | S2 | S4 | S3 | S4 | S1 |
| S1 | S2 | S3 | S4 | S1 | S2 | S3 | S4 | S1 | S2 | S3 | S4 | S1 | S2 | S3 | S4 | S1 | S2 |
| S3 | S4 | S1 | S2 | S4 | S3 | S4 | S1 | S2 | S4 | S3 | S4 | S1 | S2 | S4 | S3 | S4 | S1 |
| S1 | S2 | S3 | S4 | S1 | S2 | S3 | S4 | S1 | S2 | S3 | S4 | S1 | S2 | S3 | S4 | S1 | S2 |
| S3 | S4 | S1 | S2 | S4 | S3 | S4 | S1 | S2 | S4 | S3 | S4 | S1 | S2 | S4 | S3 | S4 | S1 |
| S1 | S2 | S3 | S4 | S1 | S2 | S3 | S4 | S1 | S2 | S3 | S4 | S1 | S2 | S3 | S4 | S1 | S2 |
| S3 | S4 | S1 | S2 | S4 | S3 | S4 | S1 | S2 | S4 | S3 | S4 | S1 | S2 | S4 | S3 | S4 | S1 |

DISPLAY DEVICE AND METHOD FOR DRIVING DISPLAY DEVICE

REFERENCE TO RELATED APPLICATIONS

This application is a national stage application under 35 USC 371 of International Application No. PCT/JP2010/062803, filed Jul. 29, 2010, which claims priority from Japanese Patent Application No. 2009-270817, filed Nov. 27, 2009, the entire contents of which are incorporated herein by reference.

FIELD OF THE INVENTION

The present invention relates to a display device that displays a halftone with use of a temporal luminance change.

BACKGROUND OF THE INVENTION

There has been proposed a technique for improving the viewing angle characteristic of a liquid crystal display device by displaying an input tone a plurality of times while switching the γ characteristic. Patent Literature 1, for example, discloses an arrangement of (i) dividing pixels in a predetermined pixel unit into high-luminance pixels and low-luminance pixels and (ii) changing the brightness for each frame.

FIG. 40 illustrates a brightness setting method disclosed in Patent Literature 1. (a) of FIG. 40 illustrates an arrangement of dividing 16 pixels in a 4×4 matrix into bright pixels and dark pixels at a ratio of 1:3 for each frame in such a manner that no high-luminance pixels are adjacent to each other on their edges. (b) of FIG. 40 illustrates an arrangement of dividing 16 pixels in a 4×4 matrix into bright pixels and dark pixels at a ratio of 1:1 for each frame in such a manner that no high-luminance pixels are adjacent to each other on their edges. The arrangement of (a) of FIG. 40 is set so that the brightness of each pixel for each frame is changed through a cycle of a bright state and a dark state with a ratio of 1:3. The brightness of the pixel 5, for example, is changed as follows from a first frame through to a fourth frame: bright->dark->dark->dark. The arrangement of (b) of FIG. 40 is set so that the brightness of each pixel for each frame is changed through a cycle of a bright state and a dark state with a ratio of 1:1. The brightness of the pixel 6, for example, is changed as follows from a first frame through to a fourth frame: bright->dark->bright->dark.

Patent Literature 1 discloses having checked display quality from the first frame through to the fourth frame at 60 Hz at a time ratio of 1:1 for a bright state and a dark state, and thus found that its arrangement can carry out a display in which unevenness is sufficiently reduced and no flicker is visually recognizable. Patent Literature 1 discloses having evaluated display unevenness visually for a still image and a moving image that assumes a use for a television. Patent Literature 1 discloses that in the case of displaying a moving image, unevenness is visually even less recognizable due to the motion of an image and is thus unnoticeable.

Japanese Patent Application Publication, Tokukai, No. 2004-302270 A (Publication Date: Oct. 28, 2004)

Japanese Patent Application Publication, Tokukaihei, No. 7-121144 A (Publication Date: May 12, 1995)

Japanese Patent Application Publication, Tokukai, No. 2006-184516 A (Publication Date: Jul. 13, 2006)

SUMMARY OF INVENTION

The above conventional display device that carries out a display with use of a temporal luminance change, however, has been found to have decreased display quality when carrying out a scroll display because a particular noise pattern is superimposed over an image and is recognized as unevenness.

In the case of displaying a still image, each pixel repeatedly changes between a bright state and a dark state, and respective images of the individual frames are combined with one another to be visually recognized, with the result that the combined image is free from unevenness and has high display quality. Thus, the still image in FIG. 37, for example, is visually recognized as it is. In the case where an image is scrolled in a lateral direction (that is, a row direction), however, the combined image is, because a viewer's eyes follow the image being scrolled, observed in such a state that a certain pattern appears to be superimposed over the combined image as illustrated in FIG. 39, with the result that the visually recognized image has decreased quality. In the case of (a) of FIG. 40, a certain pattern is superimposed over a combined image at, for example, 2 dots/frame scroll. In the case of (b) of FIG. 40, a certain pattern is superimposed over a combined image at, for example, 1 dot/frame scroll.

The above certain pattern is formed, when a viewer's eyes follow an image, by interference between the following three factors:

(1) Pixels being observed are switched at certain time intervals (2) Luminance of pixels is changed at certain time intervals (3) Pixels with different luminance changes are placed at certain intervals This phenomenon occurs also in the case where an image is scrolled in a different direction such as a longitudinal direction (that is, a column direction).

The present invention has been accomplished in view of the above problem with conventional art. It is an object of the present invention to provide (i) a display device and (ii) a display device driving method each of which can provide an arrangement in which, when an image is scrolled, a noise pattern does not easily overlap the image.

In order to solve the above problem, a display device of the present invention is an active matrix display device including: regions each including an arrangement of first pixels each changing, in order to display a gray level for a period, its luminance in a sequence repeating a luminance change pattern of A frames (where A is an even number) through a cycle of the A frames, wherein: the sequence includes, in each of the regions, a plurality of sequences that are shifted from one another in the luminance change pattern along a time axis direction and that are defined for the each of the regions, one of the plurality of sequences being allotted to each of the first pixels in the each of the regions; for the each of the first pixels, each jth frame corresponding to at least one integer j (where $1 \leq j \leq A$) for each of the A frames has, in a corresponding sequence, a luminance having a first mean value that is different from a second mean value of a luminance, in the corresponding sequence, of a frame occurring A/2 frames after the jth frame; the first pixels are provided in correspondence with each of data colors each as a constituent element of a display color, the data colors including an achromatic color; and assuming that a row direction and a column direction are each an array direction, the each of the regions includes an arrangement pattern including, for each of at least one array direction and for each of the data colors, X first pixels arranged next to one another in the array direction, the arrangement pattern being repeated in the array direction, the X being represented by $$X = A/2 + A \cdot Q,$$

where Q is an integer of 0 or greater and is defined for the each of the regions.

According to the above arrangement, X is found by multiplying A/2 by an odd number. In the case where (i) a scroll image moves by a predetermined number of dots per frame and (ii) with a unit of N consecutive frames, two adjacent units of such N frames are respectively a first-half period $\alpha$ and a second-half period $\beta$, the number of frames during each of which, among X, each pixel at a visual point has a luminance level for a bright pixel is, during a period $\alpha+\beta$, equal (=N) to the number of frames during each of which the pixel at a visual point has a luminance level for a dark pixel. With this arrangement, there is an offset between brightnesses viewed by the viewer as afterimages through the period $\alpha+\beta$ during an image scroll.

The above arrangement thus allows an image that is uniform in luminance to be obtained by combining, throughout a scroll period, respective images displayed by pixels each at a visual point. This indicates that (i) in the case where constant gray scale data is continuously inputted, an image with a uniform gray level is observed by a scroll as well, and that (ii) a scroll causes no particular noise pattern.

Consequently, the above arrangement advantageously provides a display device which can provide an arrangement in which, when an image is scrolled, a noise pattern does not easily overlap the image.

In order to solve the above problem, a display device driving method of the present invention is a display device driving method for driving an active matrix display device, the display device driving method including: creating regions each including an arrangement of first pixels each changing, in order to display a gray level for a period, its luminance in a sequence repeating a luminance change pattern of A frames (where A is an even number) through a cycle of the A frames; causing the sequence to include, in each of the regions, a plurality of sequences that are shifted from one another in the luminance change pattern along a time axis direction and that are defined for the each of the regions, one of the plurality of sequences being allotted to each of the first pixels in the each of the regions; causing, for the each of the first pixels, each jth frame corresponding to at least one integer j (where $1 \leq j \leq A$) for each of the A frames to have, in a corresponding sequence, a luminance having a first mean value that is different from a second mean value of a luminance, in the corresponding sequence, of a frame occurring A/2 frames after the jth frame; providing the first pixels in correspondence with each of data colors each as a constituent element of a display color, the data colors including an achromatic color; and causing, assuming that a row direction and a column direction are each an array direction, the each of the regions to include an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for the each of the regions.

According to the above arrangement, X is found by multiplying A/2 by an odd number. In the case where (i) a scroll image moves by a predetermined number of dots per frame and (ii) with a unit of N consecutive frames, two adjacent units of such N frames are respectively a first-half period $\alpha$ and a second-half period $\beta$, the number of frames during each of which, among X, each pixel at a visual point has a luminance level for a bright pixel is, during a period $\alpha+\beta$, equal (=N) to the number of frames during each of which the pixel at a visual point has a luminance level for a dark pixel. With this arrangement, there is an offset between brightnesses viewed by the viewer as afterimages through the period $\alpha+\beta$ during an image scroll.

The above arrangement thus allows an image that is uniform in luminance to be obtained by combining, throughout a scroll period, respective images displayed by pixels each at a visual point. This indicates that (i) in the case where constant gray scale data is continuously inputted, an image with a uniform gray level is observed by a scroll as well, and that (ii) a scroll causes no particular noise pattern.

Consequently, the above arrangement advantageously provides a display device driving method which can provide an arrangement in which, when an image is scrolled, a noise pattern does not easily overlap the image.

As described above, a display device of the present invention is an active matrix display device including: regions each including an arrangement of first pixels each changing, in order to display a gray level for a period, its luminance in a sequence repeating a luminance change pattern of A frames (where A is an even number) through a cycle of the A frames, wherein: the sequence includes, in each of the regions, a plurality of sequences that are shifted from one another in the luminance change pattern along a time axis direction and that are defined for the each of the regions, one of the plurality of sequences being allotted to each of the first pixels in the each of the regions; for the each of the first pixels, each jth frame corresponding to at least one integer j (where $1 \leq j \leq A$) for each of the A frames has, in a corresponding sequence, a luminance having a first mean value that is different from a second mean value of a luminance, in the corresponding sequence, of a frame occurring A/2 frames after the jth frame; the first pixels are provided in correspondence with each of data colors each as a constituent element of a display color, the data colors including an achromatic color; and assuming that a row direction and a column direction are each an array direction, the each of the regions includes an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for the each of the regions.

Consequently, the above arrangement advantageously provides a display device which can provide an arrangement in which, when an image is scrolled, a noise pattern does not easily overlap the image.

As described above, a display device driving method of the present invention is a display device driving method for driving an active matrix display device, the display device driving method including: creating regions each including an arrangement of first pixels each changing, in order to display a gray level for a period, its luminance in a sequence repeating a luminance change pattern of A frames (where A is an even number) through a cycle of the A frames; causing the sequence to include, in each of the regions, a plurality of sequences that are shifted from one another in the luminance change pattern along a time axis direction and that are defined for the each of the regions, one of the plurality of sequences being allotted to each of the first pixels in the each of the regions; causing, for the each of the first pixels, each jth frame corresponding to at least one integer j (where $1 \leq j \leq A$) for each of the A frames to have, in a corresponding sequence, a luminance having a first mean value that is different from a second mean value of a luminance, in the corresponding sequence, of a frame occurring A/2 frames after the jth frame; providing the first pixels in correspondence with each of data colors each as a constituent element of a display color, the data colors including an achromatic color; and causing, assuming that a row direction and a column direction are each an array direction, the each of the regions to include an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for the each of the regions.

Consequently, the above arrangement advantageously provides a display device driving method which can provide an arrangement in which, when an image is scrolled, a noise pattern does not easily overlap the image.

BRIEF DESCRIPTION OF DRAWINGS

FIG. 16 is a diagram illustrating, in accordance with an embodiment of the present invention, how brightnesses are offset at a scroll rate of 7 dot/F.

FIG. 23 is a diagram illustrating a lookup table corresponding to the gamma curves in FIG. 21.

FIG. 24 is a diagram illustrating a lookup table corresponding to the gamma curves in FIG. 22.

FIG. 27 is a diagram illustrating a first Example of a combination of the arrangement of first pixels and a sequence in accordance with an embodiment of the present invention.

FIG. 29 is a diagram illustrating a second Example of a combination of the arrangement of first pixels and a sequence in accordance with an embodiment of the present invention.

FIG. 31 is a diagram illustrating a third Example of a combination of the arrangement of first pixels and a sequence in accordance with an embodiment of the present invention.

FIG. 33 is a diagram illustrating a fourth Example of a combination of the arrangement of first pixels and a sequence in accordance with an embodiment of the present invention.

DETAILED DESCRIPTION OF THE INVENTION

An embodiment of the present invention is described below with reference to FIGS. 1 through 38.

(Arrangement of Display Device)

Figure 3:
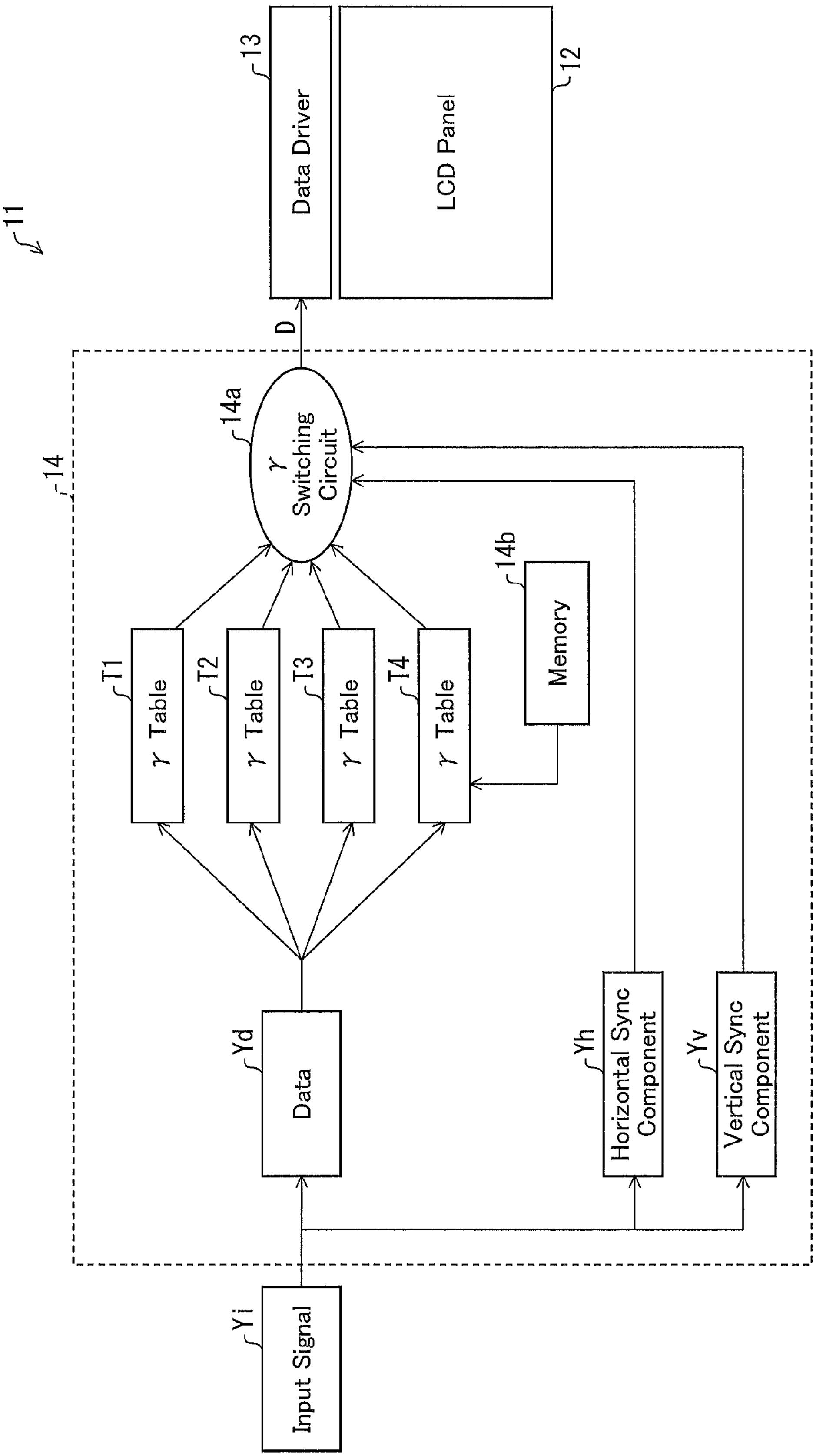
FIG. 3 is a block diagram illustrating a configuration of a display device in accordance with an embodiment of the present invention.

FIG. 3 illustrates a configuration of a liquid crystal display device (display device) 11 of the present embodiment.

The liquid crystal display device 11 is a display device of a matrix type, in particular of an active matrix type in the present embodiment. The liquid crystal display device includes: an LCD panel 12; a data driver 13; and a display control circuit 14. The display control circuit 14 includes: a γ switching circuit 14*a*; and a memory 14*b*.

The present embodiment includes pixels each changing its luminance in one of a plurality of different sequences, for example, the following four types of sequence: (i) bright->bright->dark->dark (sequence S1), (ii) bright->dark->dark->bright (sequence S2), (iii) dark->dark->bright->bright (sequence S3), and (iv) dark->bright->bright->dark (sequence S4), to include at least one pixel for each sequence. The present embodiment involves a display color that may be (i) a color mixture made up of data colors of R, G, and B as constituent elements or (ii) a single color (for example, an achromatic color or a single color of R) made up of only one data color as a constituent element. The pixels are provided in correspondence with each data color. The following first describes an example arrangement involving four types of sequence. The present embodiment can use, other than R, G, and B, a data color, such as C (cyan), M (magenta), and Y (yellow), for use in a color mixing system. The present embodiment uses, as a single picture element, a collection of pixels for a color mixture display which pixels display the above data colors, respectively.

The display control circuit 14, upon receipt of an input signal Yi, retrieves data Yd, a horizontal sync component Yh, and a vertical sync component Yv from the input signal Yi. The display control circuit 14 then carries out γ conversion of each individual element of the data Yd with reference to one of four lookup tables (gamma curves) T1 through T4.

The lookup table T1 is a table for use in γ conversion to generate display data D for a first frame with the sequences S1 through S4. Similarly, the lookup tables T2 through T4 are tables for use in γ conversion to generate display data D for second, third, and fourth frames, respectively.

The lookup tables T1 through T4 are stored in the memory 14*b*, and are read from the memory 14*b* to serve for a γ conversion process. The γ switching circuit 14*a*, which uses the horizontal sync component Yh and the vertical sync component Yv as timing signals, supplies the display data D, obtained by the γ conversion with reference to the lookup tables T1 through T4, to the data driver 13 while switching outputs for output of the display data D in accordance with (i) arrangement positions (see, for example, FIG. 1) of the sequences S1 through S4 and (ii) the sequential data supply order “first frame->second frame->third frame->fourth frame->first frame-> . . . ”. The data driver 13 (i) carries out, for example, DA conversion of the supplied display data D into display data, such as a data signal represented by an analog voltage, that is in a form suitable for the LCD panel 12, and (ii) supplies the display data to the LCD panel 12.

(Brightness Change and Sequence of Each Pixel and Pixel Arrangement)

The present embodiment, as illustrated in FIGS. 10 through 16 referred to below, divides a display period into repeated cycles, as in the sequences S1 through S4 above, each of which cycles includes A frames, namely a continuous sequence of a first frame through to an Ath frame. The present embodiment then generates, for each of the A frames, a plurality of sequences of a pattern of change in brightness of each pixel. The plurality of sequences have respective waveforms with respective luminance change patterns that are shifted from one another by substantially one-Ath of the cycle. The sequences S1 through S4 are of the case of A=4, resulting in four types of sequence. The description below first deals with the case of A=4 as an example.

The case below carries out γ conversion for the frames with reference to respective lookup tables independent of one another, as in the lookup table T1 for a first frame, the lookup table T2 for a second frame, the lookup table T3 for a third frame, and the lookup table T4 for a fourth frame. Even two “bright” pixels or two “dark” pixels can be converted independently of each other into gray scale data, that is, display data D.

The following describes (i) “bright” pixels and “dark” pixels and (ii) the definition of a sequence and placement of pixels.

Figure 1:
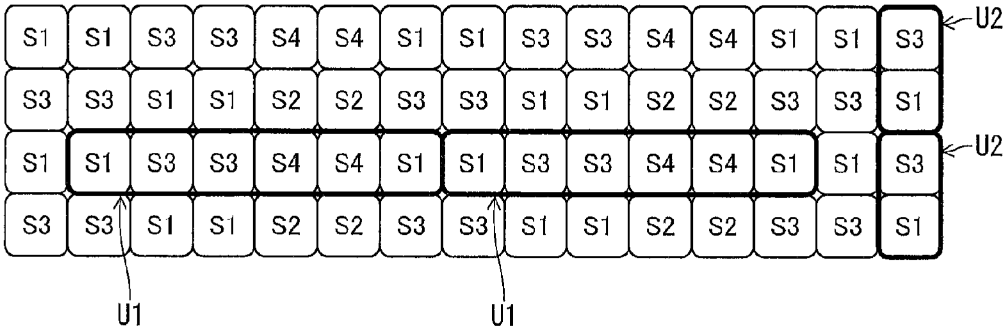
FIG. 1 is a diagram illustrating an example arrangement pattern in accordance with an embodiment of the present invention.

The description below assumes a first pixel to be any one of the pixels in FIG. 1 that are each indicated by one of S1 through S4. The first pixel, in the case of receiving an input signal Yi indicative of a gray level and displaying the gray level for a certain period, changes its luminance in one of the sequences S1 through S4, each of which repeats a four-frame-long cycle of a luminance change pattern that is four frames long. The description below further assumes a region that is defined by a certain arrangement of first pixels. FIG. 1 illustrates a case that assumes two types of such a region: a region (arrangement pattern U1) that is defined by first pixels arranged next to one another in a row direction, and a region (arrangement pattern U2) that is defined by first pixels arranged next to one another in a column direction (that is, a signal line direction). The arrangement patterns U1 and U2 each include, as the above sequences, a plurality of sequences that (i) are defined for a corresponding one of the arrangement patterns U1 and U2 and that (ii) have respective luminance change patterns which are shifted from one another in a time axis direction. Each first pixel in each of the arrangement patterns U1 and U2 is assigned one of the plurality of sequences; for example, the arrangement pattern U1 includes first pixels with the respective sequences S1, S3, S3, S4, S4, and S1 which first pixels are arranged next to one another in that order in the row direction, that is, from left to right in FIG. 1, whereas the arrangement pattern U2 includes first pixels with the respective sequences S3 and S1 which first pixels are arranged next to each other in that order in the column direction, that is, from top to bottom in FIG. 1.

Figure 10:
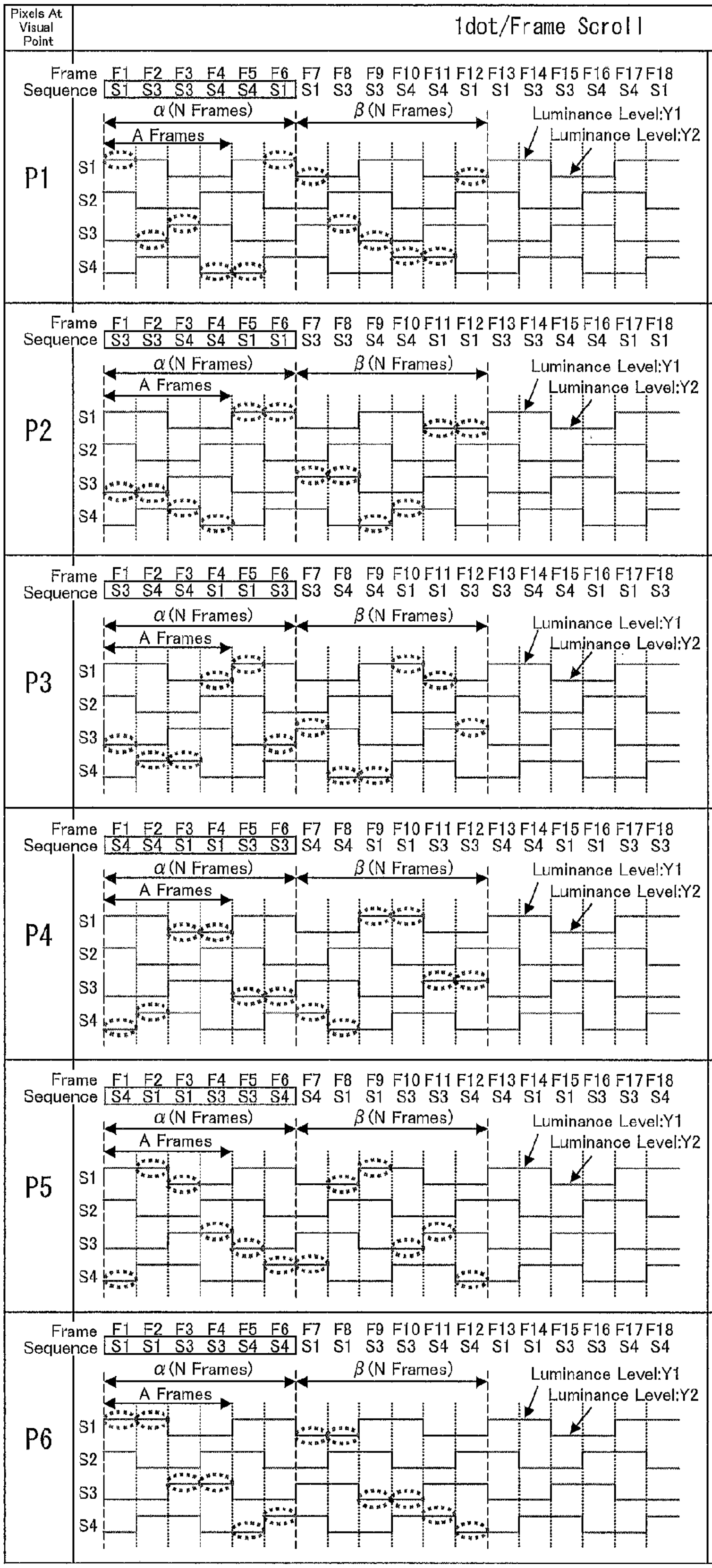
FIG. 10 is a diagram illustrating, in accordance with an embodiment of the present invention, how brightnesses are offset at a scroll rate of 1 dot/F.
Figure 11:
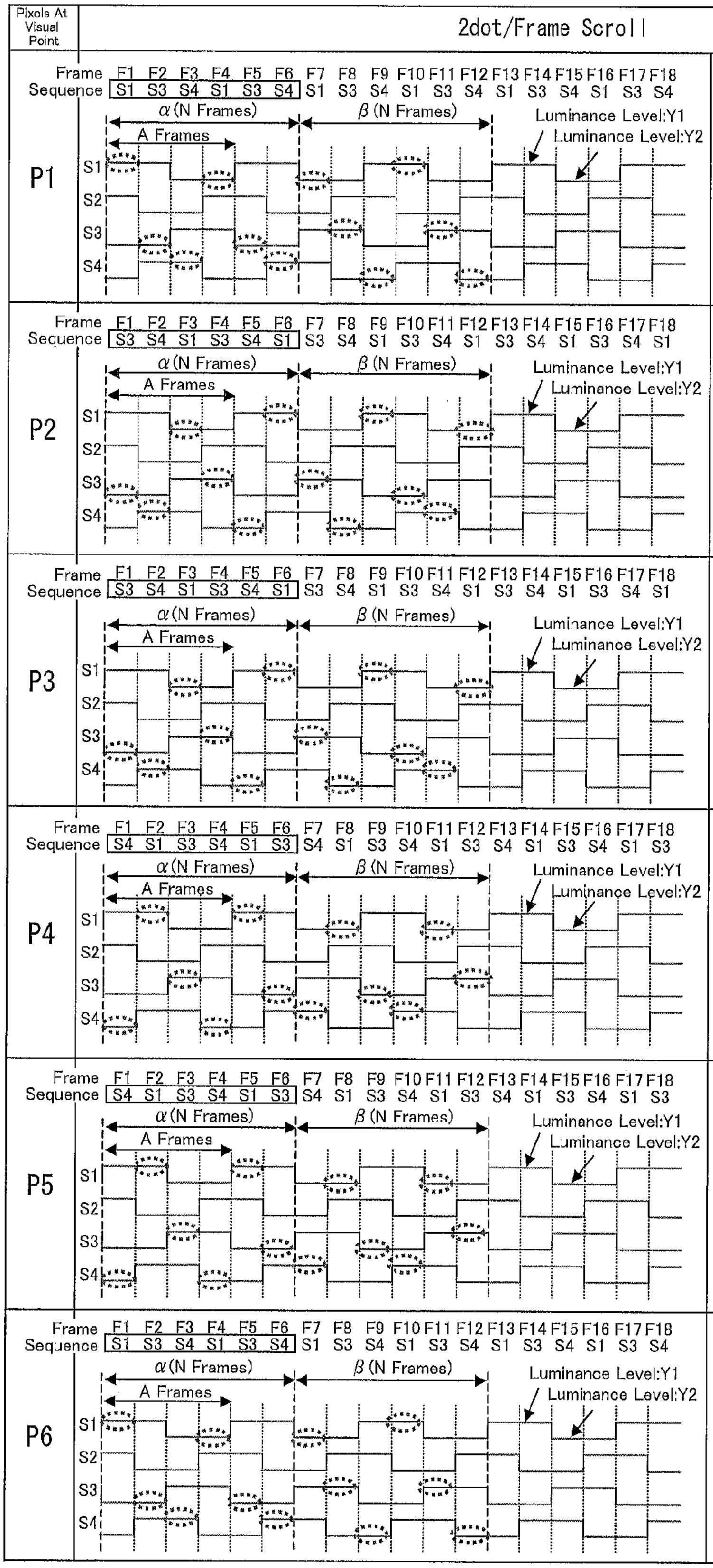
FIG. 11 is a diagram illustrating, in accordance with an embodiment of the present invention, how brightnesses are offset at a scroll rate of 2 dot/F.
Figure 12:
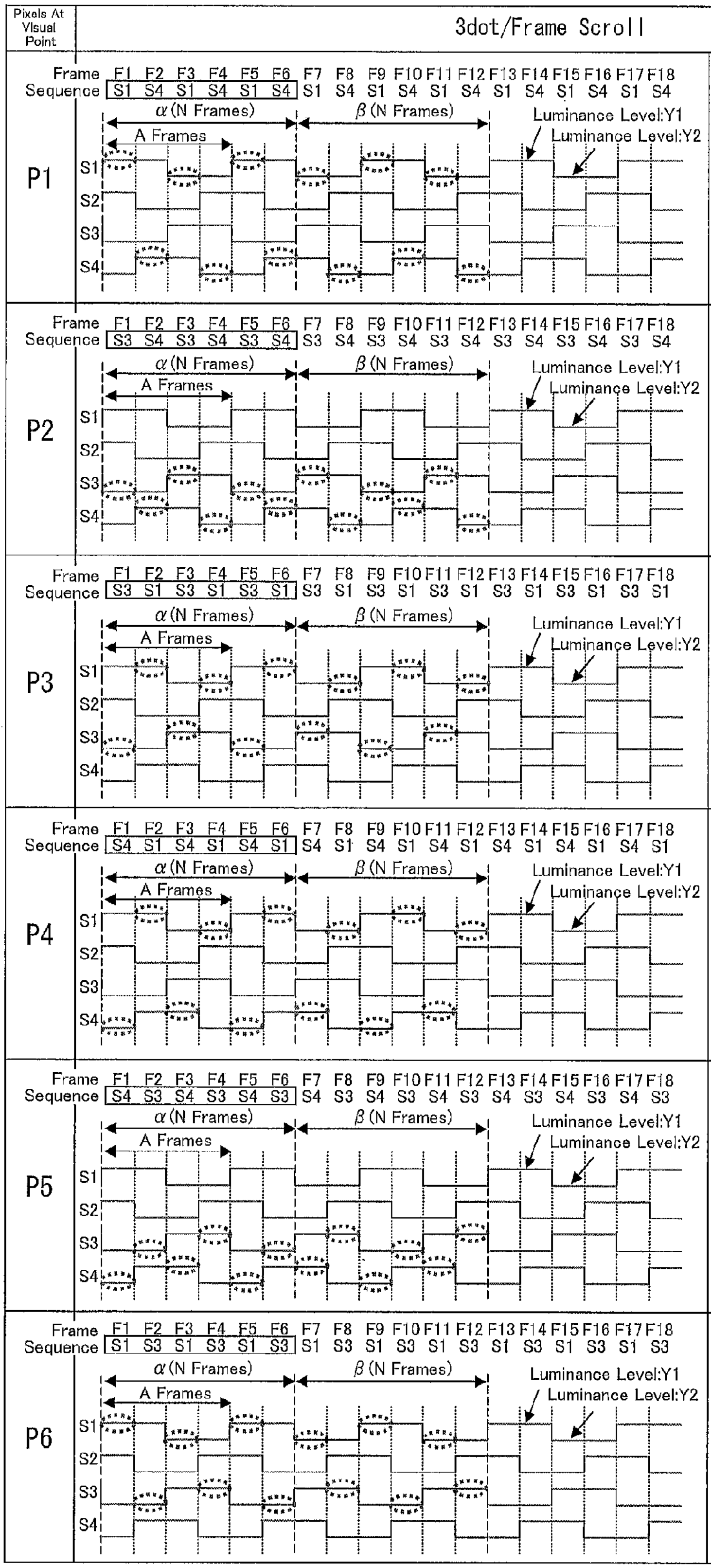
FIG. 12 is a diagram illustrating, in accordance with an embodiment of the present invention, how brightnesses are offset at a scroll rate of 3 dot/F.
Figure 13:
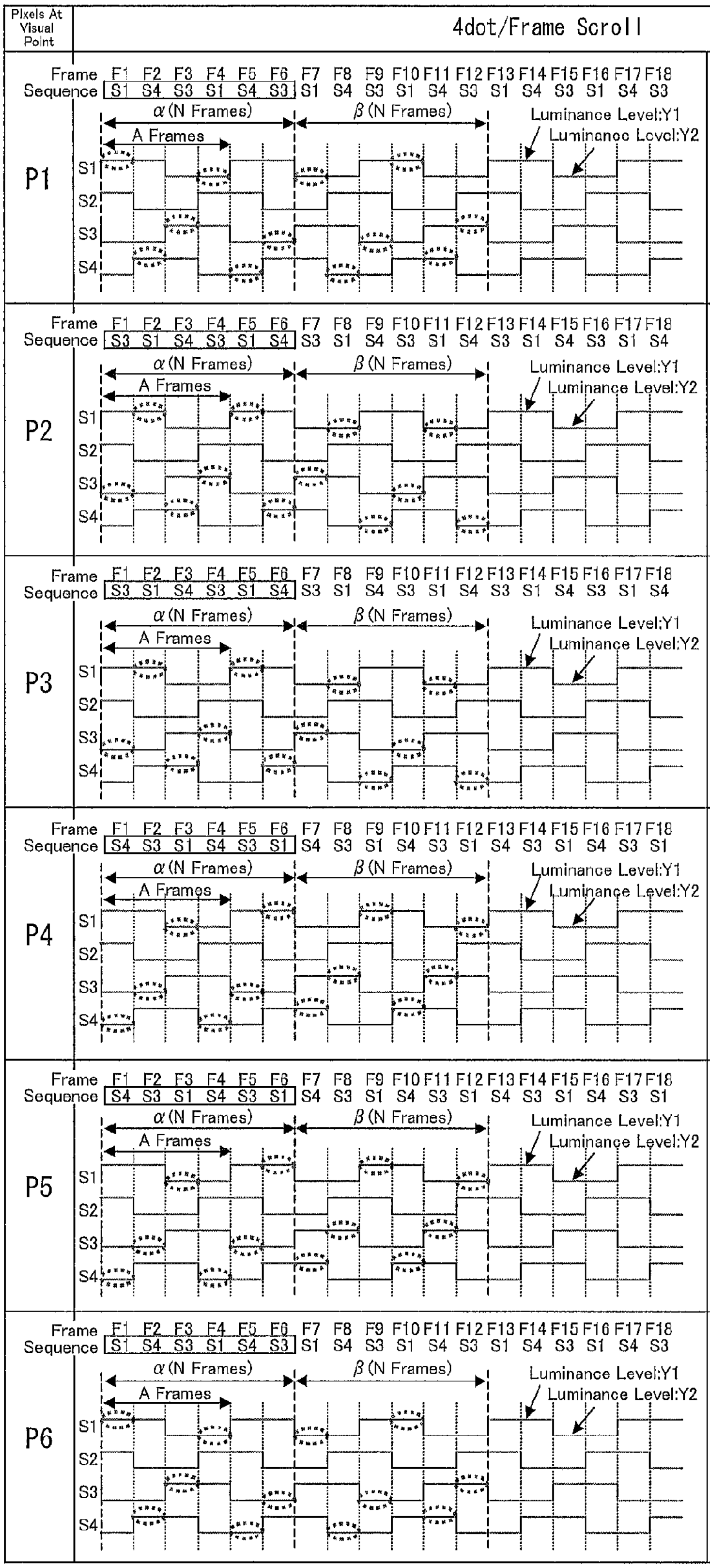
FIG. 13 is a diagram illustrating, in accordance with an embodiment of the present invention, how brightnesses are offset at a scroll rate of 4 dot/F.
Figure 14:
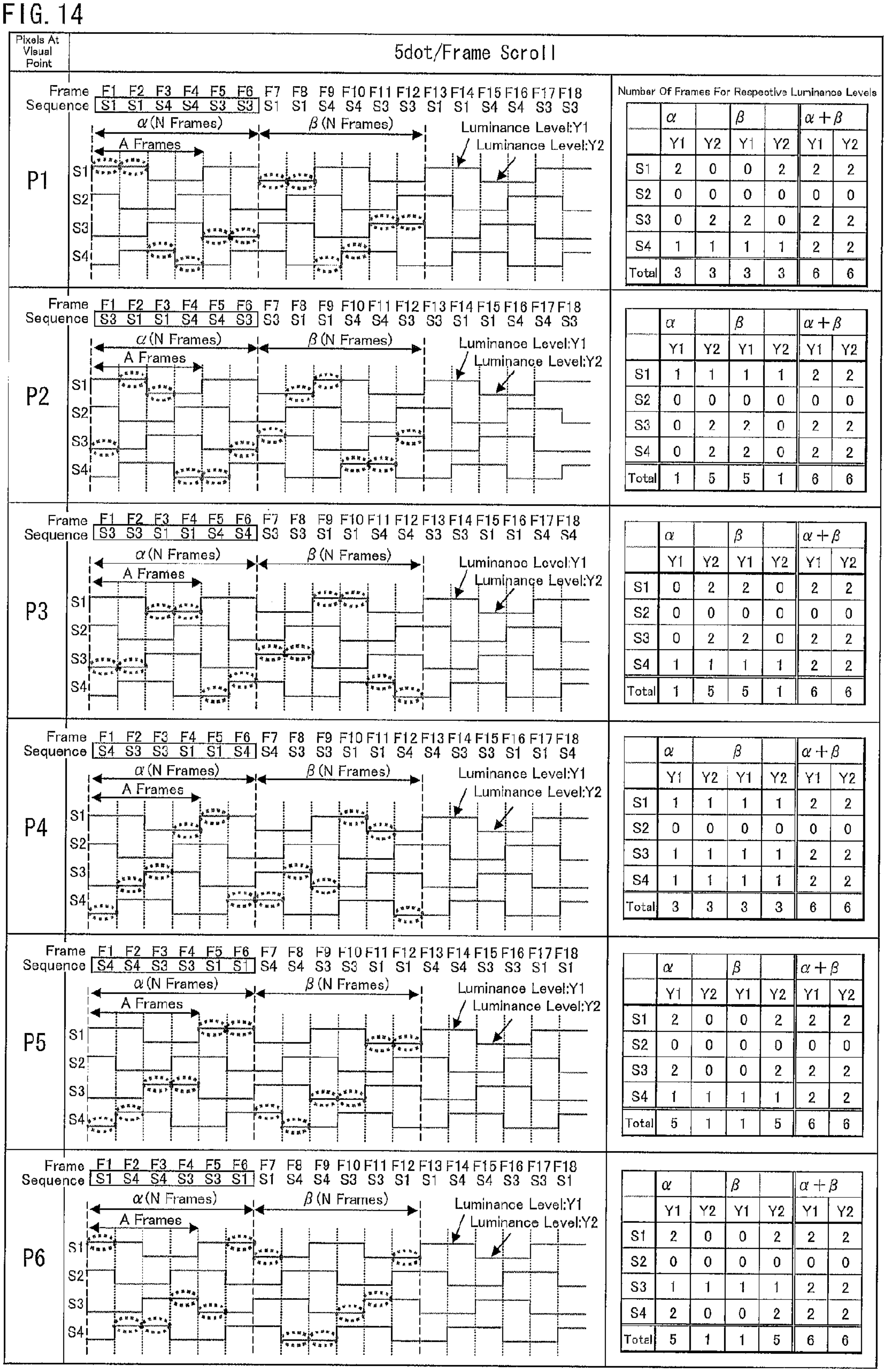
FIG. 14 is a diagram illustrating, in accordance with an embodiment of the present invention, how brightnesses are offset at a scroll rate of 5 dot/F.
Figure 15:
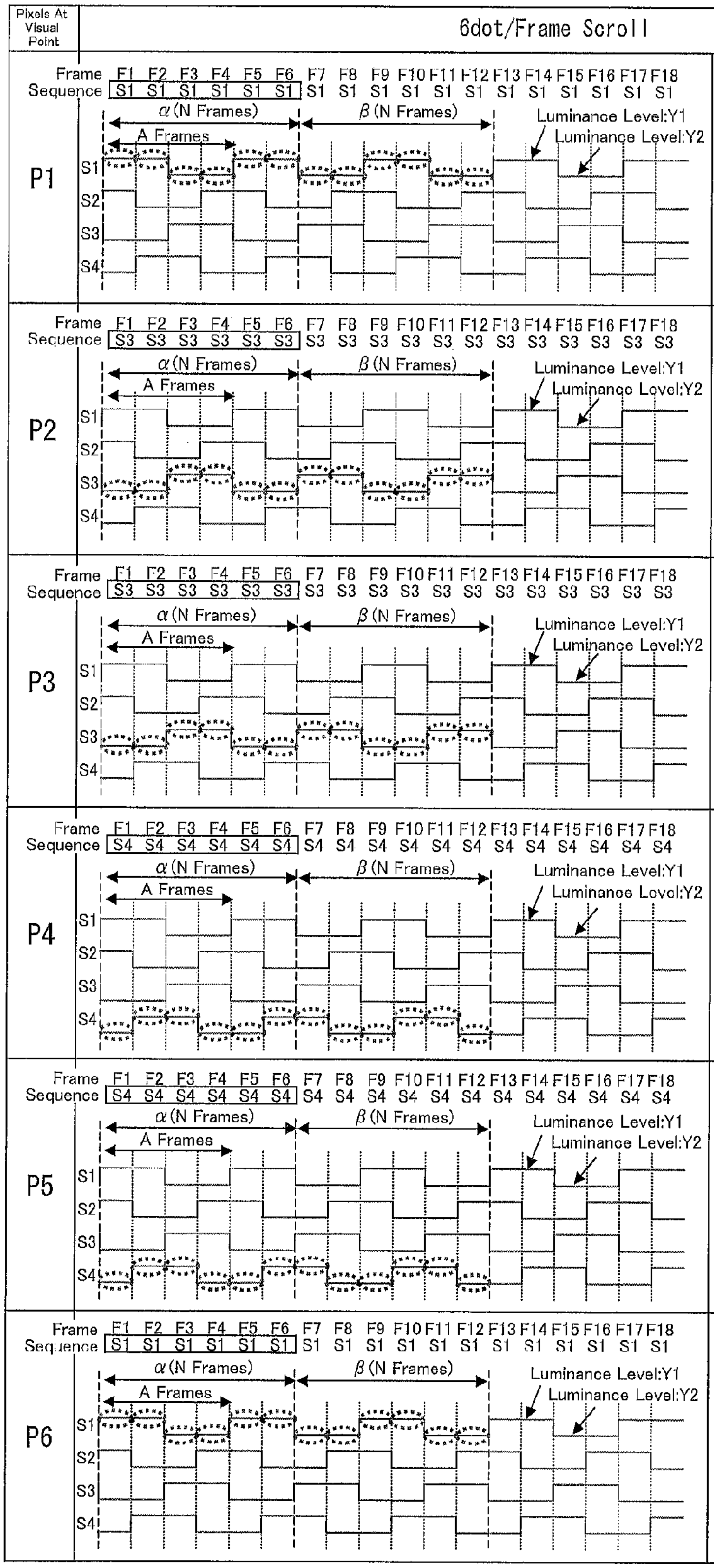
FIG. 15 is a diagram illustrating, in accordance with an embodiment of the present invention, how brightnesses are offset at a scroll rate of 6 dot/F.

The first pixels described above are arranged such that as indicated by the sequences in FIG. 10, the luminance for each of the first to fourth frames (that is, a unit of four frames making up one cycle, such as (i) frames F1 through F4 and (ii) frames F5 through F8) has a mean value that is different from the mean value of luminance for a frame that is half the cycle (that is, two frames) after the above frame. For example, the first pixels are arranged such that (i) the frame F1 serving as the first frame has a luminance with a mean value of a luminance level Y1, whereas the frame F3 serving as the third frame and occurring two frames after the frame F1 has a luminance with a mean value of a luminance level Y2, the respective mean values being different from each other, and that (ii) the frame F4 serving as the fourth frame has a luminance with a mean value of the luminance level Y2, whereas the frame F6 serving as the second frame and occurring two frames after the frame F4 has a luminance with a mean value of the luminance level Y1, the respective mean values being different from each other.

The above arrangement can be generalized as follows: In a case where a gray level is displayed for a certain period, in each region that is defined by an arrangement of first pixels each changing its luminance in one of a plurality of sequences each of which repeats a A-frame-long cycle of a luminance change pattern that is A frames long, each jth frame corresponding to at least one integer j (where $1 \leq j \leq A$) for each of the A frames has, in a corresponding sequence, a luminance with a mean value that is different from the mean value of luminance, in the corresponding sequence, of a frame occurring A/2 frames after the jth frame.

If the average luminance observed for the individual jth frames converges to a value as an increasing number of frames are observed, the above mean value of luminance refers to the convergent value. The mean value for a jth frame corresponding to a particular j refers to the mean value of luminance which mean value is obtained from a combination of individual jth frames corresponding to only such a particular j in the sequence.

Figure 5:
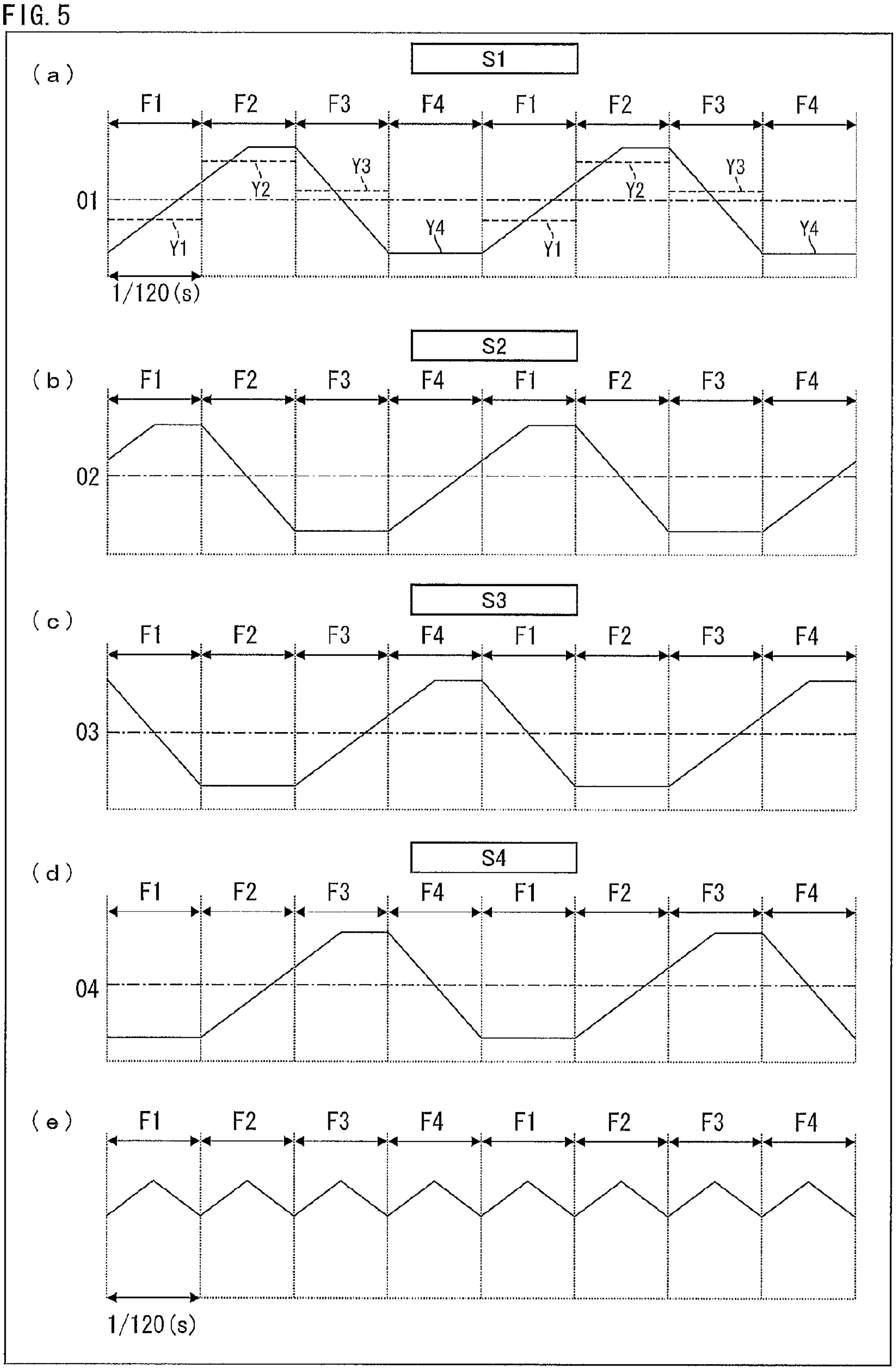
FIG. 5 shows waveform charts illustrating respective luminance changes according to the sequences of FIG. 4, where (a) through (d) illustrate respective luminance changes according to different sequences, and (e) illustrates the sum of luminances of individual pixels according to the respective sequences of (a) through (d).

The sequences in FIG. 10 each have a constant luminance within each frame. The luminance thus has a mean value that is equal to a value of luminance at any moment. In contrast, in the case of a sequence with a luminance that is changeable within a frame as illustrated in FIG. 5, the average luminance for each frame is found from values of luminance at all moments. For example, in (a) of FIG. 5, the frame F1 as the first frame has an average luminance of Y1, the frame F2 as the second frame has an average luminance of Y2, the frame F3 as the third frame has an average luminance of Y3, and the frame F4 as the fourth frame has an average luminance of Y4. The above description that the luminance of each jth frame has a mean value that is different from the mean value of luminance of a frame occurring A/2 frames after the jth frame indicates that Y1 and Y3 are different from each other and that Y2 and Y4 are different from each other.

As illustrated in, for example, FIGS. 5 and 10, for each jth frame corresponding to any integer j (where $1 \leq j \leq A$) for each of the A frames, each first pixel is arranged to have, in its sequence, a luminance with a mean value that falls between (i) the mean value of luminance, in the corresponding sequence, for each jth frame and (ii) the mean value of luminance, in a corresponding sequence, for a frame occurring A/2 frames after the jth frame.

In (a) of FIG. 5, the luminance for the sequence S1 has a mean value of O1, which falls between Y1 and Y3 and between Y2 and Y4.

In FIG. 10, the luminance for the sequence S1 has a mean value of (Y1+Y2)/2, which falls between Y1 and Y2.

In a case (not illustrated in the drawings) where the luminance for each jth frame has a mean value that is equal to the mean value of luminance, in a corresponding sequence, for a frame occurring A/2 frames after the jth frame, the luminance for the sequence has a mean value that is equal to the above mean value.

The following describes a relation between the luminance and a data signal potential.

Figure 4:
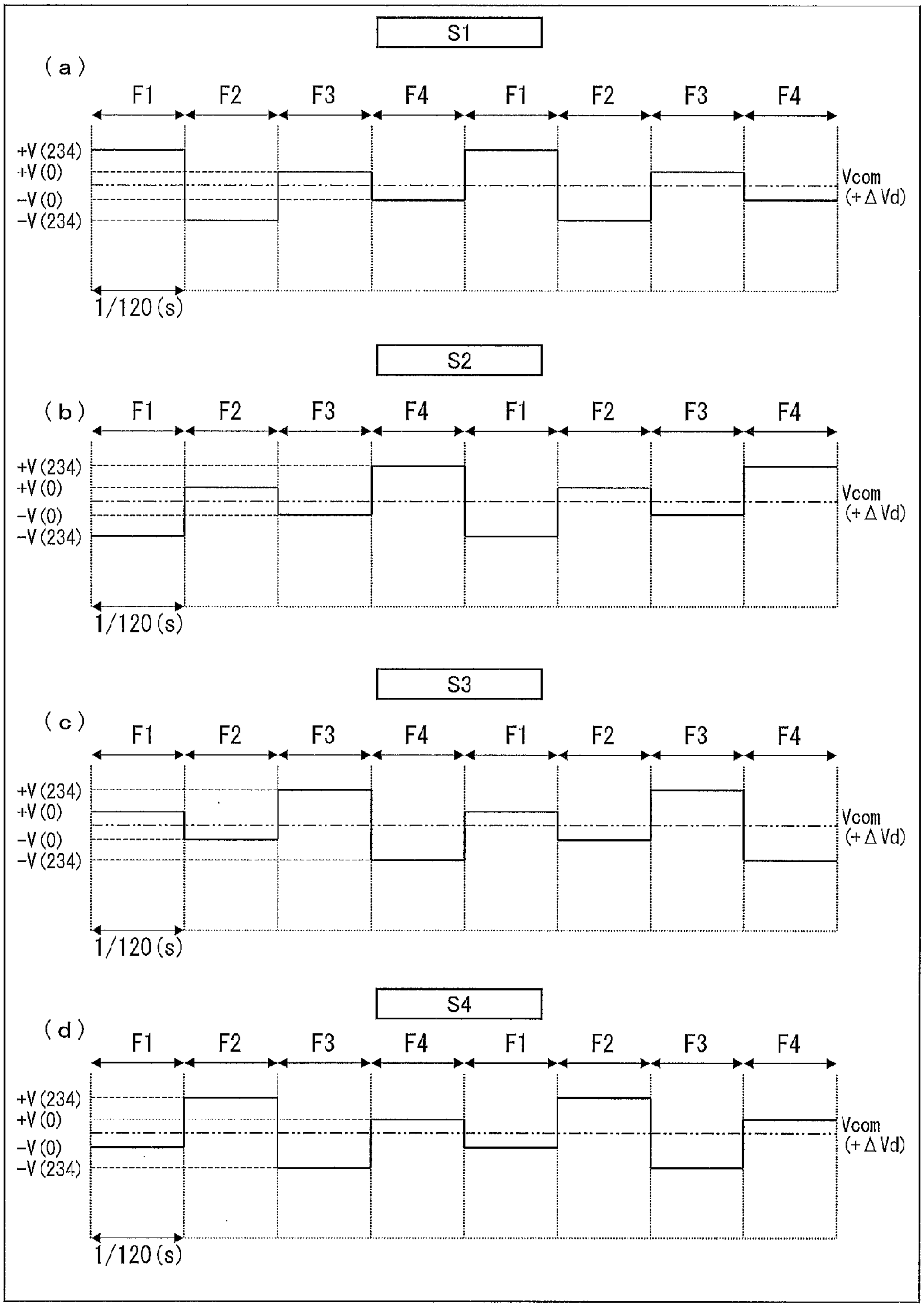
FIG. 4 shows first waveform charts illustrating, in accordance with an embodiment of the present invention, respective example data signal potentials corresponding to sequences, where (a) through (d) illustrate respective example data signal potentials corresponding to different sequences.

(a) through (d) of FIG. 4 illustrate example data signal potentials for the respective four sequences S1 through S4 described above. In these examples, the data signal has a write frequency of, for example, 120 Hz. FIG. 4 illustrates, for simplification of explanation, a case in which (i) data signal potentials do not take a feed-through effect into consideration and (ii) the positive and negative amplitudes of a data signal have a center that is equal to a common electrode potential. If the feed-through effect is taken into consideration, the amplitude center is regarded as corresponding to the potential obtained by adding a feed-through voltage $\Delta Vd$ to the common electrode potential. Further, in a case where the individual data signal potentials have respective feed-through voltages $\Delta Vd$ different from one another, the amplitude center may be determined for each gray level.

A pixel changing its luminance in the sequence S1 is, as illustrated in (a) of FIG. 4, supplied with (i) during a first frame F1, a positive-polarity signal potential +V (234) corresponding to 234 gray levels, (ii) during a second frame F2, a negative-polarity signal potential −V (234) corresponding to 234 gray levels, (iii) during a third frame F3, a positive-polarity signal potential +V (0) corresponding to 0 gray levels, and (iv) during a fourth frame F4, a negative-polarity signal potential −V (0) corresponding to 0 gray levels.

A pixel changing its luminance in the sequence S2 is, as illustrated in (b) of FIG. 4, supplied with (i) during the first frame F1, a negative-polarity signal potential −V (234) corresponding to 234 gray levels, (ii) during the second frame F2, a positive-polarity signal potential +V (0) corresponding to 0 gray levels, (iii) during the third frame F3, a negative-polarity signal potential −V (0) corresponding to 0 gray levels, and (iv) during the fourth frame F4, a positive-polarity signal potential +V (234) corresponding to 234 gray levels.

A pixel changing its luminance in the sequence S3 is, as illustrated in (c) of FIG. 4, supplied with (i) during the first frame F1, a positive-polarity signal potential +V (0) corresponding to 0 gray levels, (ii) during the second frame F2, a negative-polarity signal potential −V (0) corresponding to 0 gray levels, (iii) during the third frame F3, a positive-polarity signal potential +V (234) corresponding to 234 gray levels, and (iv) during the fourth frame F4, a negative-polarity signal potential −V (234) corresponding to 234 gray levels.

A pixel changing its luminance in the sequence S4 is, as illustrated in (d) of FIG. 4, supplied with (i) during the first frame F1, a negative-polarity signal potential −V (0) corresponding to 0 gray levels, (ii) during the second frame F2, a positive-polarity signal potential +V (234) corresponding to 234 gray levels, (iii) during the third frame F3, a negative-polarity signal potential −V (234) corresponding to 234 gray levels, and (iv) during the fourth frame F4, a positive-polarity signal potential +V (0) corresponding to 0 gray levels.

In response to the drive illustrated in (a) through (d) of FIG. 4, (i) a pixel corresponding to the sequence S1 changes its luminance (transmittance), from the first frame F1 through to the fourth frame F4, through the pattern illustrated in (a) of FIG. 5, (ii) a pixel corresponding to the sequence S2 changes its luminance (transmittance), from the first frame F1 through to the fourth frame F4, through the pattern illustrated in (b) of FIG. 5, (iii) a pixel corresponding to the sequence S3 changes its luminance (transmittance), from the first frame F1 through to the fourth frame F4, through the pattern illustrated in (c) of FIG. 5, and (iv) a pixel corresponding to the sequence S4 changes its luminance (transmittance), from the first frame F1 through to the fourth frame F4, through the pattern illustrated in (d) of FIG. 5. (e) of FIG. 5 schematically illustrates the sums of luminance exhibited, from the first frame F1 through to the fourth frame F4, by respective pixels corresponding to the sequences S1 through S4. In the case where the individual pixels have respective visually recognized average luminances illustrated in (e) of FIG. 5, the above gray level settings allow a luminance corresponding to 150 gray levels (halftone) to be visually recognized. The sequences S1 through S4 have respective average luminances of O1, O2, O3, and O4, which are equal to one another in the present embodiment. These average luminances may, however, be different from one another, and are set independently of one another in accordance with the values to which the respective sums of luminance are set.

Figure 6:
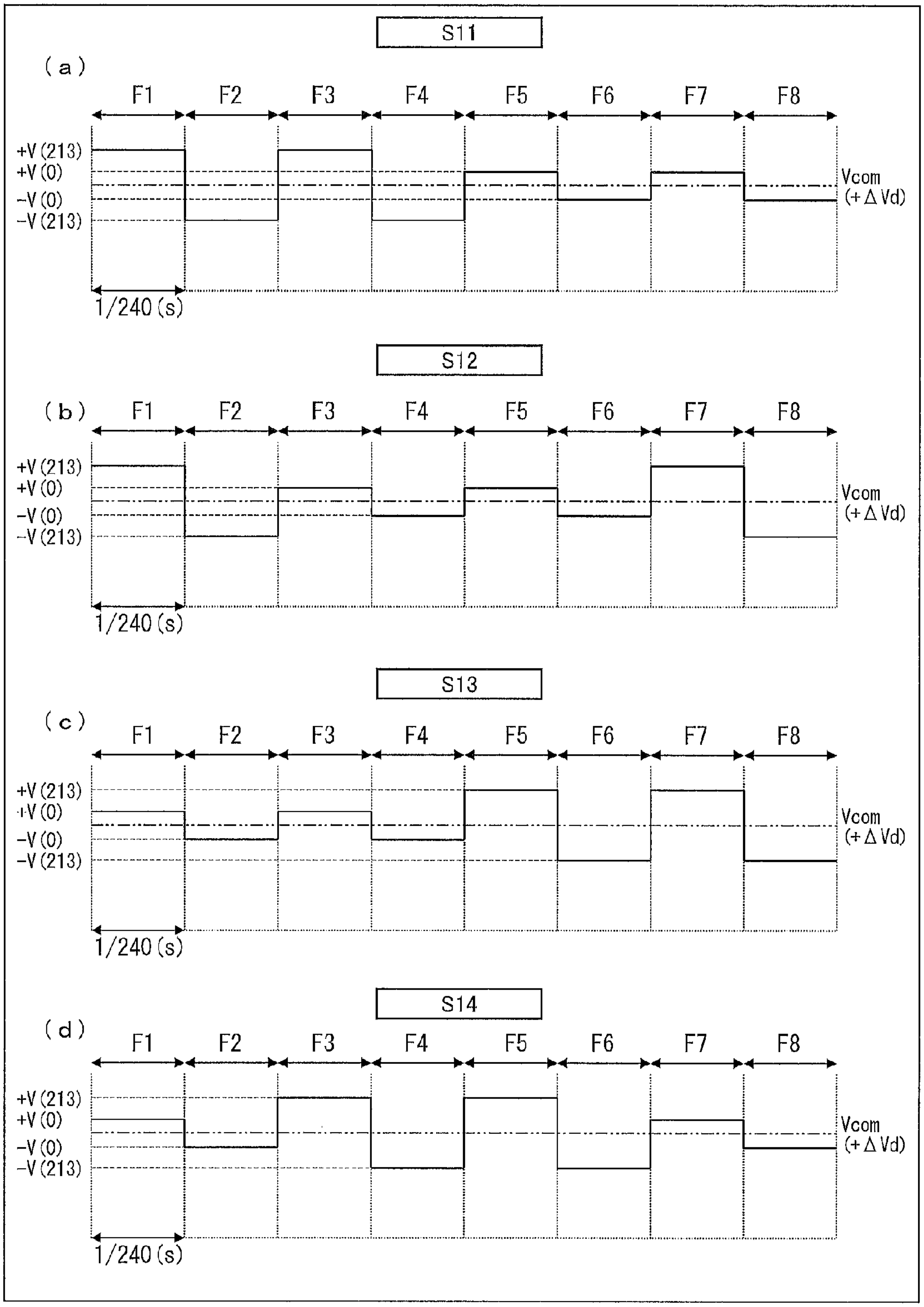
FIG. 6 shows second waveform charts illustrating, in accordance with an embodiment of the present invention, respective example data signal potentials corresponding to sequences, where (a) through (d) are waveform charts illustrating respective example data signal potentials corresponding to different sequences.

(a) through (d) of FIG. 6 illustrate, as an example involving A other than A=4, example data signal potentials corresponding to four respective sequences S11 through S14 each having an eight-frame cycle (A=8). These examples each involve (i) a frame frequency of, for example, 240 Hz and (ii) an amplitude center similar to that illustrated in FIG. 4.

A pixel changing its luminance in the sequence S11 is, as illustrated in (a) of FIG. 6, supplied with (i) during a first frame F1 and a third frame F3, a positive-polarity signal potential +V (213) corresponding to 213 gray levels, (ii) during a second frame F2 and a fourth frame F4, a negative-polarity signal potential −V (213) corresponding to 213 gray levels, (iii) during a fifth frame F5 and a seventh frame F7, a positive-polarity signal potential +V (0) corresponding to 0 gray levels, and (iv) during a sixth frame F6 and an eighth frame F8, a negative-polarity signal potential −V (0) corresponding to 0 gray levels.

A pixel changing its luminance in the sequence S12 is, as illustrated in (b) of FIG. 6, supplied with (i) during the first frame F1 and the seventh frame F7, a positive-polarity signal potential +V (213) corresponding to 213 gray levels, (ii) during the second frame F2 and the eighth frame F8, a negative-polarity signal potential −V (213) corresponding to 213 gray levels, (iii) during the third frame F3 and the fifth frame F5, a positive-polarity signal potential +V (0) corresponding to 0 gray levels, and (iv) during the fourth frame F4 and the sixth frame F6, a negative-polarity signal potential −V (0) corresponding to 0 gray levels.

A pixel changing its luminance in the sequence S13 is, as illustrated in (c) of FIG. 6, supplied with (i) during the fifth frame F5 and the seventh frame F7, a positive-polarity signal potential +V (213) corresponding to 213 gray levels, (ii) during the sixth frame F6 and the eighth frame F8, a negative-polarity signal potential −V (213) corresponding to 213 gray levels, (iii) during the first frame F1 and the third frame F3, a positive-polarity signal potential +V (0) corresponding to 0 gray levels, and (iv) during the second frame F2 and the fourth frame F4, a negative-polarity signal potential −V (0) corresponding to 0 gray levels.

Figure 7:
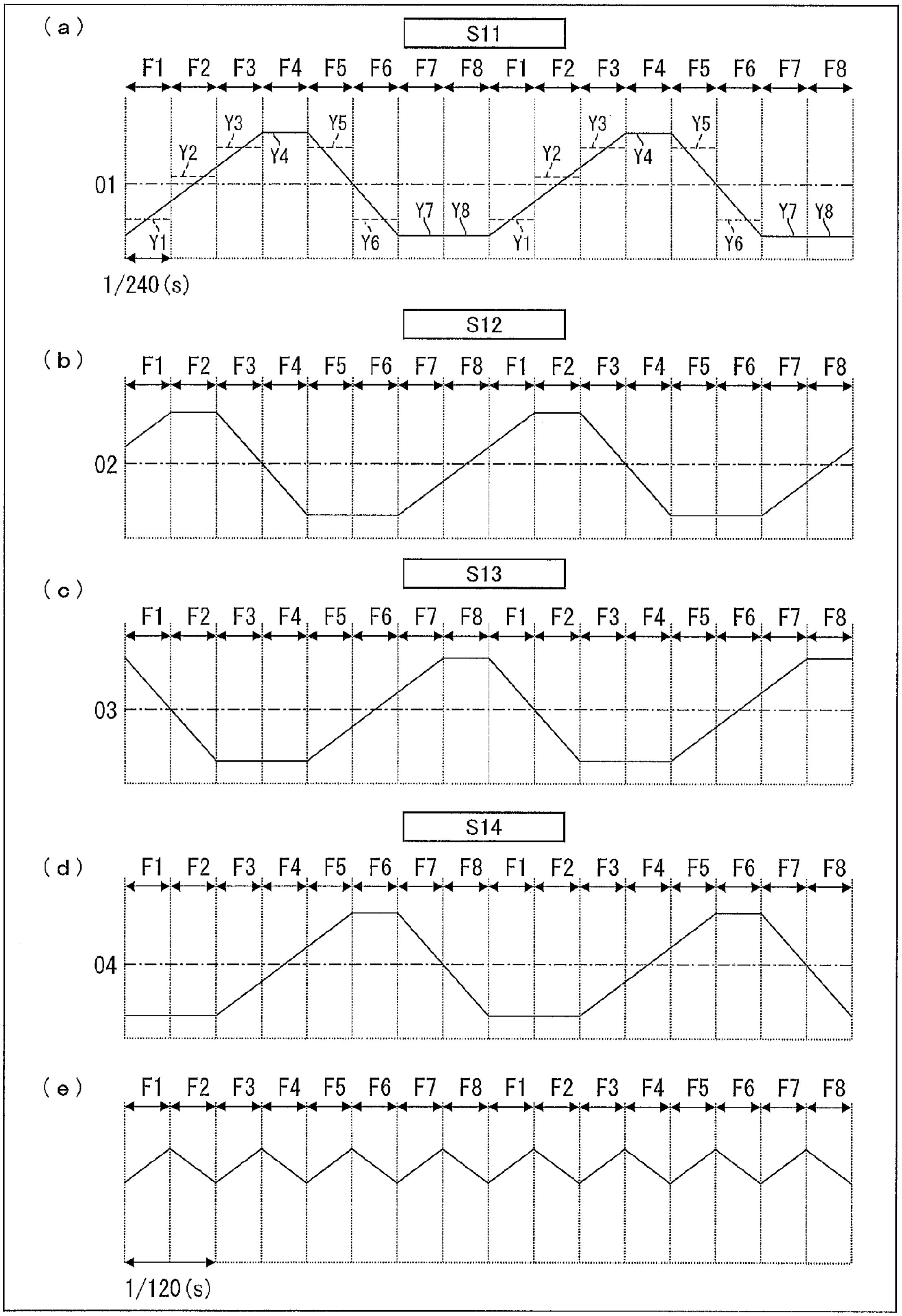
FIG. 7 shows waveform charts illustrating respective luminance changes according to the sequences of FIG. 6, where (a) through (d) illustrate respective luminance changes according to different sequences, and (e) illustrates the sum of luminances of individual pixels according to the respective sequences of (a) through (d).

In response to the drive illustrated in (a) through (d) of FIG. 6, (i) a pixel corresponding to the sequence S11 changes its luminance (transmittance), from the first frame F1 through to the eighth frame F8, through the pattern illustrated in (a) of FIG. 7, (ii) a pixel corresponding to the sequence S12 changes its luminance (transmittance), from the first frame F1 through to the eighth frame F8, through the pattern illustrated in (b) of FIG. 7, (iii) a pixel corresponding to the sequence S13 changes its luminance (transmittance), from the first frame F1 through to the eighth frame F8, through the pattern illustrated in (c) of FIG. 7, and (iv) a pixel corresponding to the sequence S14 changes its luminance (transmittance), from the first frame F1 through to the eighth frame F8, through the pattern illustrated in (d) of FIG. 7. (e) of FIG. 7 schematically illustrates the sums of luminance exhibited, from the first frame F1 through to the eighth frame F8, by respective pixels corresponding to the sequences S11 through S14. In the case where the individual pixels have respective visually recognized average luminances illustrated in (e) of FIG. 7, the above gray level settings allow a luminance corresponding to 120 gray levels (halftone) to be visually recognized. The sequences S11 through S14 have respective average luminances of O1, O2, O3, and O4, which are equal to one another in the present embodiment. These average luminances may, however, be different from one another, and are set independently of one another in accordance with the values to which the respective sums of luminance are set. FIG. 7 indicates the respective luminance averages for the first through eighth frames F1 through F8 by Y1 through Y8. In FIG. 7, O1=O2=O3=O4, Y1<O1<Y5, Y2>O1>Y6, Y3>O1>Y7, and Y4>O1>Y8.

The following describes the regularity with which the arrangement patterns U1 and U2 are each repeated.

Assuming that any row direction or column direction is a single array direction, the arrangement patterns, for each array direction, that is, a row direction or column direction, that involves a data color of, for example, R, G, or B, each include X first pixels arranged next to one another in an array direction, where $$X=A/2+A\cdot Q \text{ (where } Q \text{ is an integer of 0 or greater)} \quad (1)$$

Figure 2:
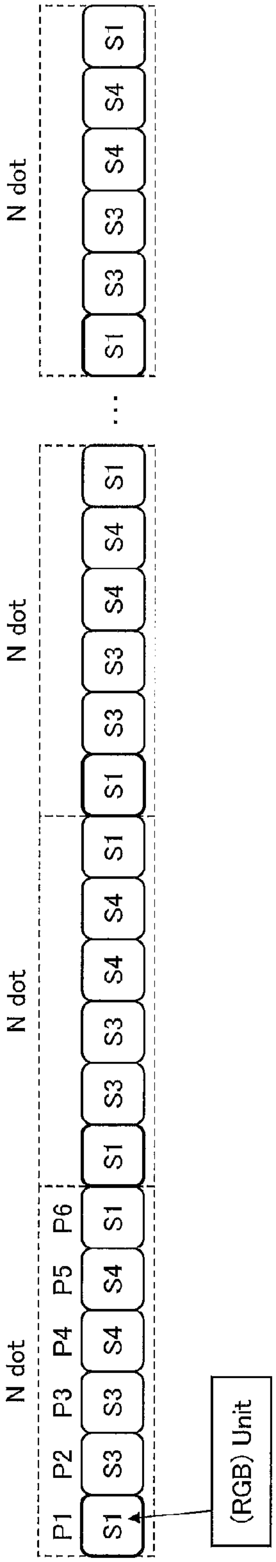
FIG. 2 is a diagram illustrating the arrangement pattern of FIG. 1 in detail.

The arrangement patterns are each repeated in the array direction. Q is determined independently for the row direction and column direction, and determined independently for each individual region in an identical array direction. Specifically, FIG. 1 illustrates a case in which (i) X=N (=6) for the row direction, whereas X=M (=2) for the column direction, and (ii) Q (corresponding to N=6)=Q1=1 for the row direction, whereas Q (corresponding to M=2)=Q2=0 for the column direction. In the case of FIG. 1, N=6 holds true for any row direction. N may, however, be determined independently for each row, that is, for each individual row-direction region. In the case of FIG. 1, M=2 similarly holds true for any column direction. M may, however, be determined independently for each column, that is, for each individual column-direction region. Thus, a row-direction region in FIG. 1 includes an arrangement pattern U1 repeated in the row direction, the arrangement pattern U1 including an arrangement Ndot that is, as illustrated in FIG. 2, made up of first pixel P1, P2, P3, P4, P5, and P6 corresponding respectively to the sequences S1, S3, S3, S4, S4, and S1. In the present embodiment, individual first pixels corresponding respectively to R, G, and B constituting a single picture element share the same sequence. The present embodiment is, however, not limited to such an arrangement. R, G, and B may thus correspond to sequences different from one another. An individual region is determined for each data color.

The case of FIG. 1 involves an arrangement pattern for each array direction, that is, for each of the row and column directions. The present embodiment is, however, not limited to such an arrangement, and may thus involve an arrangement pattern for only either of the row and column directions. The present embodiment is simply required to involve an arrangement pattern for at least one array direction.

Formula (1) indicates that X is found by multiplying half the cycle, made up of A frames, by an odd number. To clarify how this arrangement contributes to a viewer's observed image in correspondence with the number of dots by which a scroll image is moved per frame, the description below deals with cases involving, as illustrated in FIG. 9, different numbers of dots by which an image is moved per frame.

Figure 9:
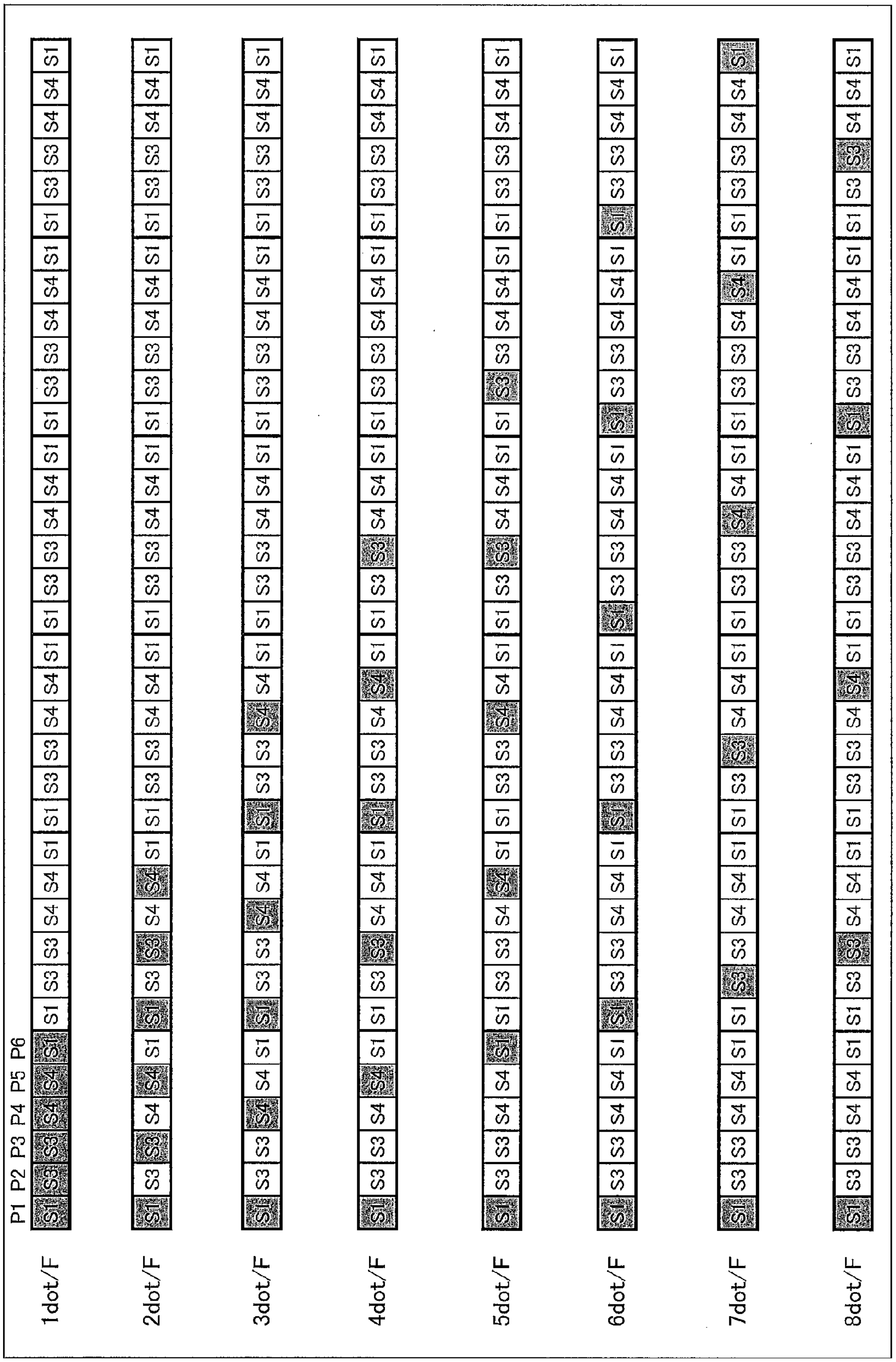
FIG. 9 is a diagram illustrating pixels at a visual point for each scroll rate in accordance with an embodiment of the present invention.

FIG. 9 illustrates first pixels displaying a horizontally scrolled image for cases involving different numbers (scroll rates) of dots by which an image is moved per frame, the cases being different from one another by 1 dot, namely cases of 1 dot/F through 8 dots/F. The description below deals only with an example of a horizontal scroll. However, a similar description applies to a vertical scroll as well.

Assuming that a first pixel P1 in the arrangement pattern U1 is a pixel at a visual point which pixel is viewed first, FIG. 9 indicates in gray a display corresponding to the first pixel P1 which display is viewed after the image has been moved by a scroll.

In the case of 1 dot/F, the image is sequentially moved from the first pixels in one arrangement pattern U1 to those in another, so that the viewer sequentially observes luminances (marked by dotted circles in FIG. 10) for the respective frames which luminances correspond to the respective sequences, illustrated in FIG. 10, for the pixel P1 at a visual point. In the case where, with a unit of N consecutive frames (N=6 in the arrangement pattern U1), two adjacent units of such N frames are respectively a first-half period $\alpha$ and a second-half period $\beta$, the number of frames during each of which the periods $\alpha$ and $\beta$ correspond to respective luminance levels of Y1 and Y2 are as shown in the tables on the right. During the period $\alpha+\beta$, the number of frames with the luminance level Y1 is equal to that of frames with the luminance level Y2, the number being N (=6). Since Y1>Y2, there is an offset between brightnesses viewed by the viewer as afterimages through the period $\alpha+\beta$ during a scroll.

Brightnesses are similarly offset for each of pixels P2 through P6 at a visual point.

An analysis of luminance of a pixel at a visual point for each of scroll rates of 2 dots/F through 7 dots/F shows that brightnesses are offset, as illustrated in FIGS. 11 through 16, in a manner similar to that illustrated in FIG. 10. The case for 7 dots/F is identical to that for 1 dot/F. The case for 8 dots/F is identical to that for 2 dots/F. In other words, the present embodiment can be regarded as involving N (mod 6) cases, in each of which cases brightnesses are offset.

Figure 8:
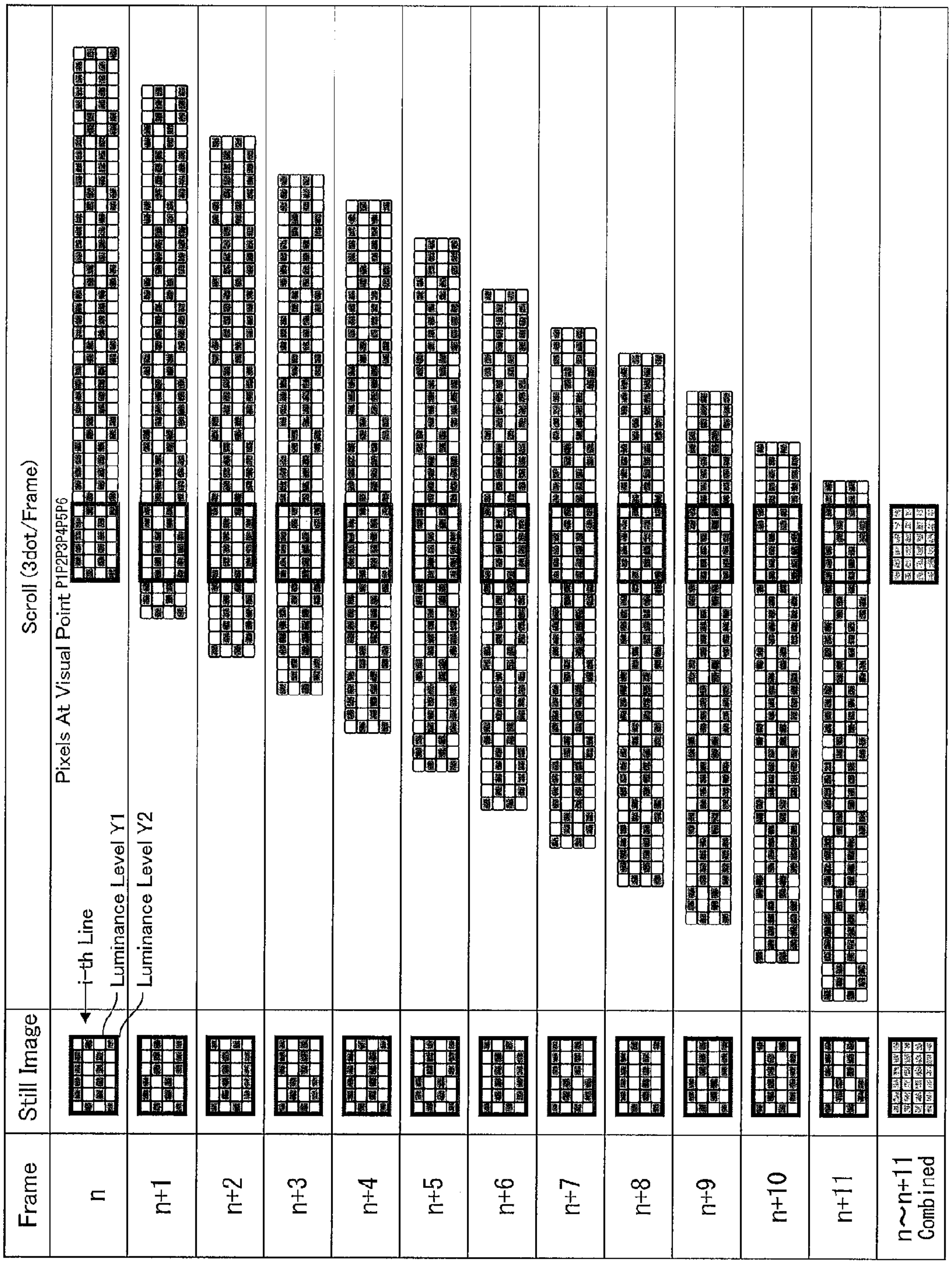
FIG. 8 is a diagram illustrating, in accordance with an embodiment of the present invention, how no noise patterns overlap each other in a scroll image.

The above arrangement allows an image that is uniform in luminance to be obtained by, for a scroll image of, for example, 3 dots/F, combining respective images, displayed by pixels P1 through P6 each at a visual point, during a period from an n-th frame to an (n+11)-th frame as illustrated in FIG. 8. This indicates that (i) in the case where the input signal Yi in FIG. 3 is constant gray scale data, an image with a uniform gray level is observed by a scroll as well, and that (ii) a scroll causes no unevenness arising from a particular noise pattern. The above arrangement thus allows the still image in FIG. 37 to be, when scrolled, visually recognized without a decrease in display quality as in FIG. 38.

Figure 17:
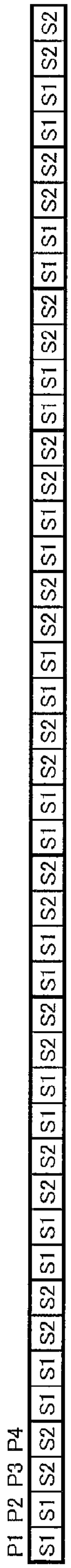
FIG. 17 is a diagram illustrating pixels at a visual point for each scroll rate in accordance with a Comparative Example for an embodiment of the present invention.
Figure 18:
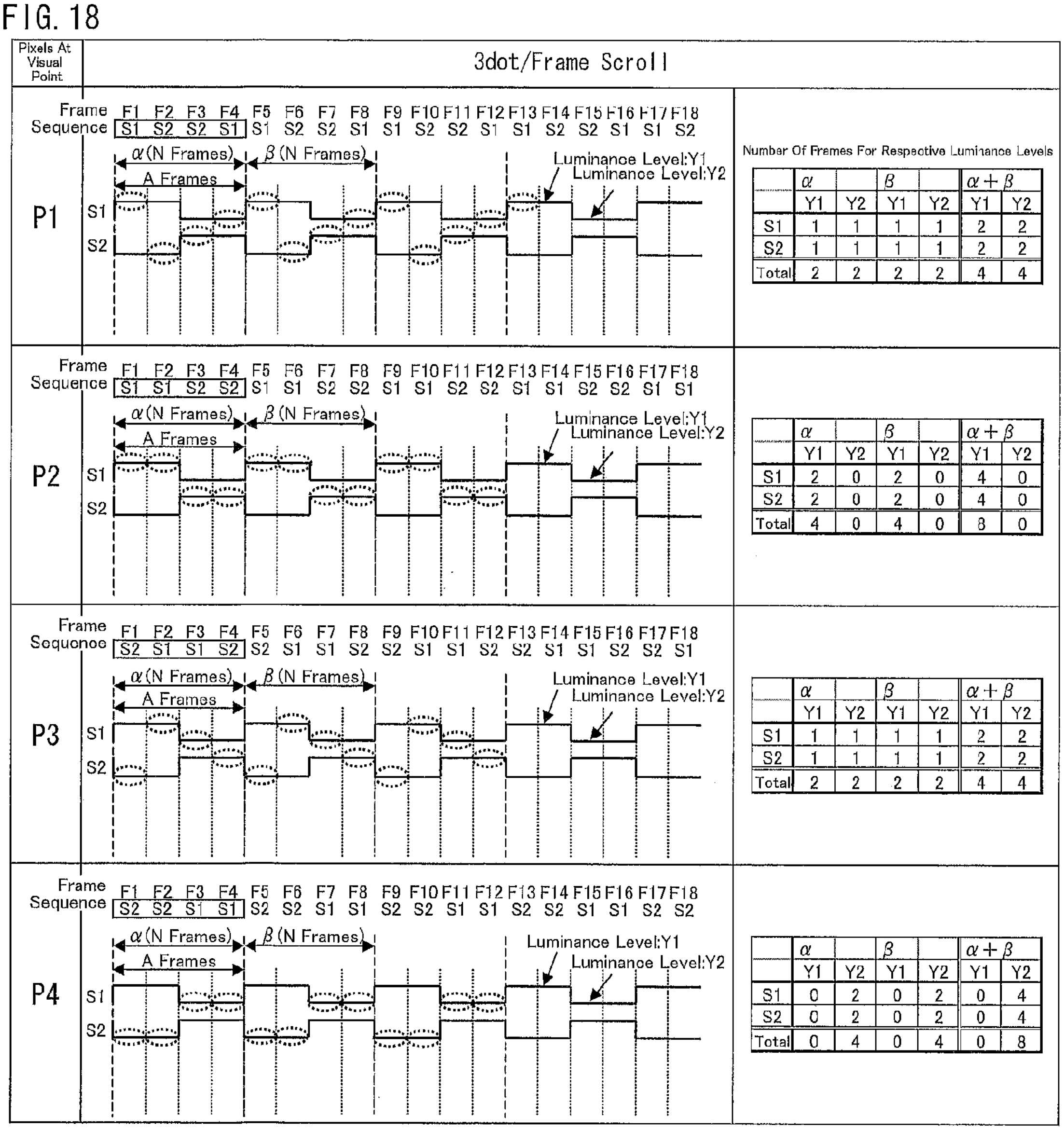
FIG. 18 is a diagram illustrating how brightnesses are not offset at the scroll rate of 3 dots/F among the arrangements of FIG. 17.
Figure 19:
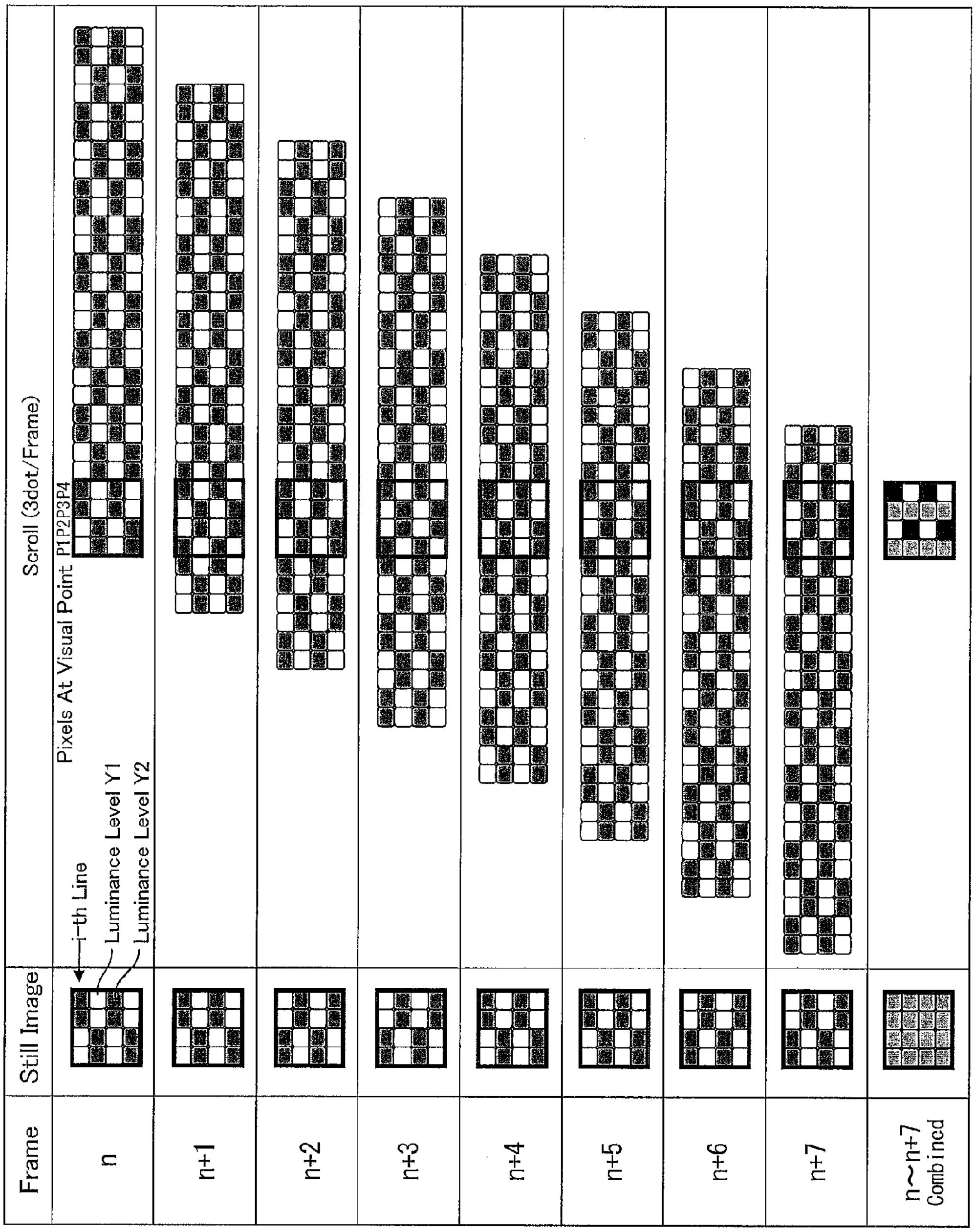
FIG. 19 is a diagram illustrating how noise patterns overlap each other in a scroll image created by the arrangements of FIG. 17.
Figure 39:
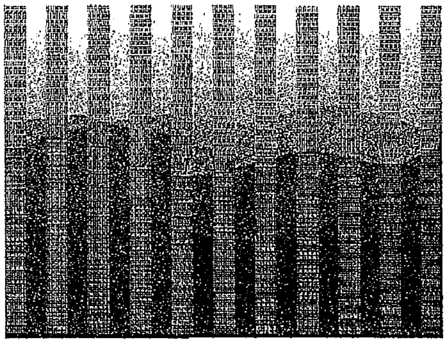
FIG. 39 is a diagram illustrating, in accordance with conventional art, how noise patterns overlap each other when the still image of FIG. 37 is scrolled.
Figure 40:
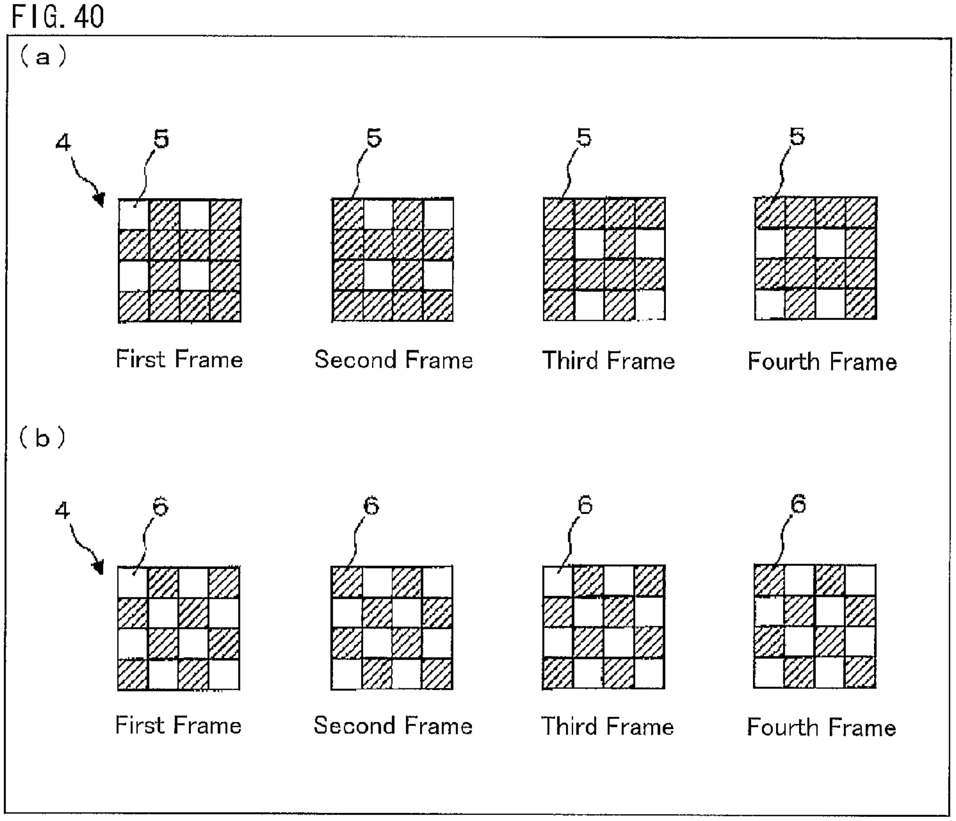
FIG. 40 is a diagram illustrating a pixel luminance change pattern and a pixel arranging method in accordance with conventional art, where (a) and (b) illustrate respective pixel luminance change patterns and respective pixel arranging methods.

The above arrangement is contrasted with conventional art as follows: In a case where, as illustrated in FIGS. 17 and 18, (i) first pixels P1 through P4 are arranged and (ii) a sequence S1 of bright (Y1)->dark (Y2)->bright (Y1)->dark (Y2) is allotted to each of the first pixels P1 and P2, whereas a sequence S2 of dark (Y2)->bright (Y1)->dark (Y2)->bright (Y1) is allotted to each of the first pixels P3 and P4, brightnesses are not offset in the first pixels P2 and P4 during the period $\alpha+\beta$ as illustrated in FIG. 18. Thus, in a case where respective images, displayed by the pixels P1 through P4 each at a visual point, are combined with one another during a period from the n-th frame to an (n+7)-th frame for a scroll image of, for example, 3 dots/F as illustrated in FIG. 19, unevenness arising from a particular noise pattern is observed. This causes the still image in FIG. 37 to be, when scrolled, visually recognized with a decrease in display quality as in FIG. 39.

Figure 20:
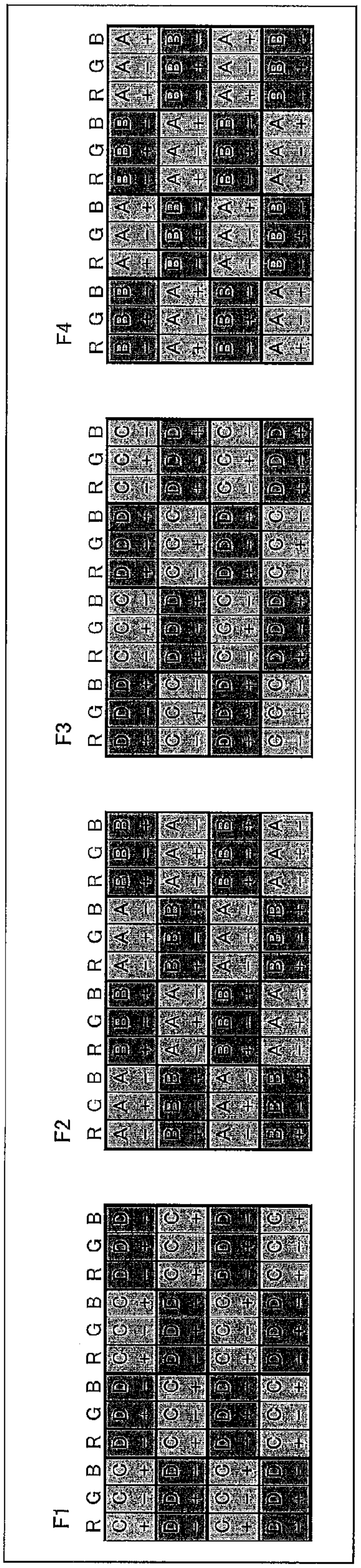
FIG. 20 is a diagram illustrating another example arrangement of first pixels in accordance with an embodiment of the present invention.

FIG. 20 illustrates a state of (i) a first pixel involving the gamma curves of γC->γA->γD->γB in the sequence of bright->dark->bright->dark, respectively, and (ii) a first pixel involving the gamma curves of γD->γB->γC->γA in the sequence of dark->bright->dark->bright, respectively, the first pixels being driven at 120 Hz under the conditions of A (number of frames per cycle)=4, N=2, and M=2, and being arranged alternatively in the row direction and the column direction for each data color. The gray scale data has a polarity subjected to dot inversion. This arrangement completes luminance averaging at 30 Hz, and can thus effectively prevent patterns from overlapping one another. A greater effect is produced with a smaller number of frames necessary for luminance averaging.

Figure 21:
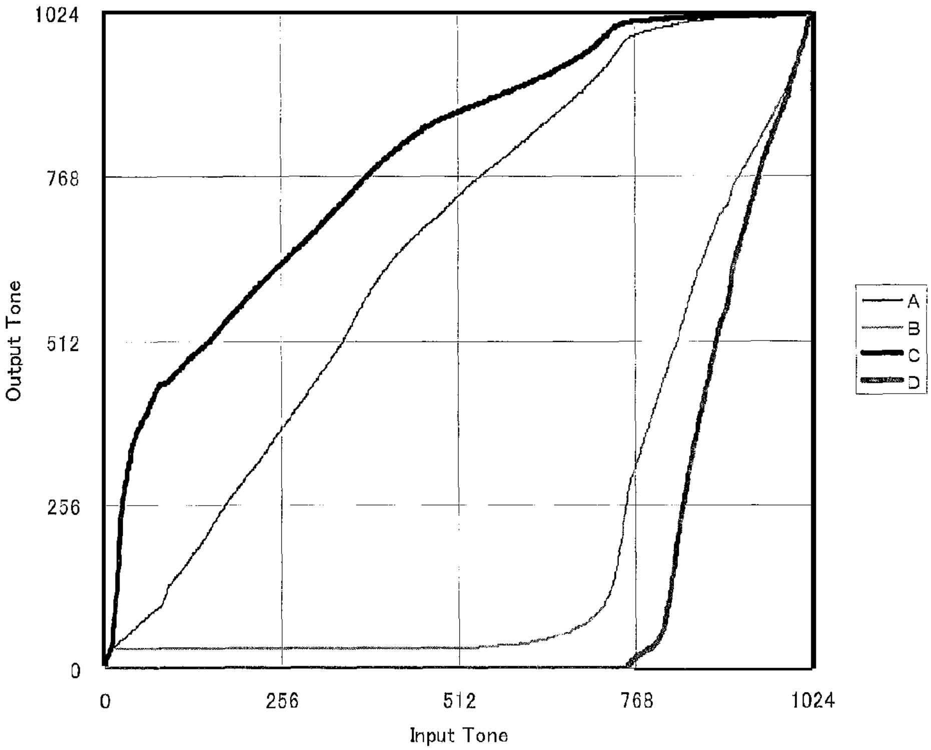
FIG. 21 is a graph illustrating gamma curves each corresponding to a luminance change pattern in the form of a rectangular wave for a first pixel in FIG. 20.
Figure 22:
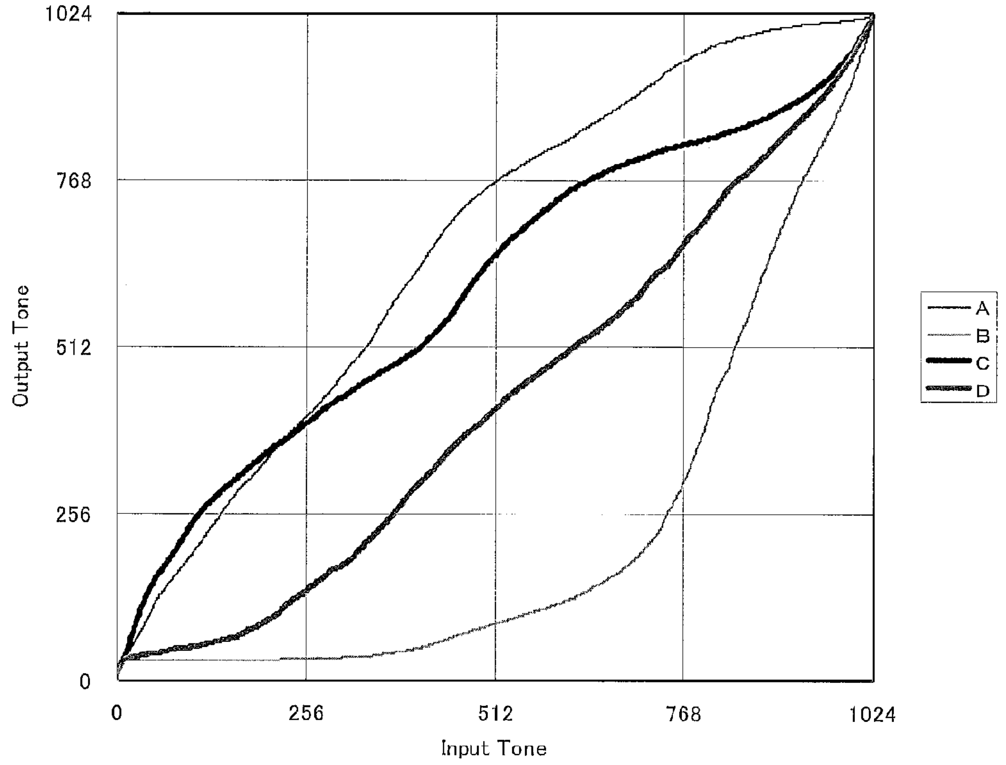
FIG. 22 is a graph illustrating gamma curves each corresponding to a luminance change pattern in the form of a triangular wave for a first pixel in FIG. 20.

FIG. 21 illustrates individual gamma curves each having a luminance change pattern in the form of a rectangular wave. FIG. 22 illustrates individual gamma curves each having a luminance change pattern in the form of a triangular wave. FIG. 23 shows a lookup table corresponding to the gamma curves each having a luminance change pattern in the form of a rectangular wave. FIG. 24 shows a lookup table corresponding to the gamma curves each having a luminance change pattern in the form of a triangular wave.

Figure 25:
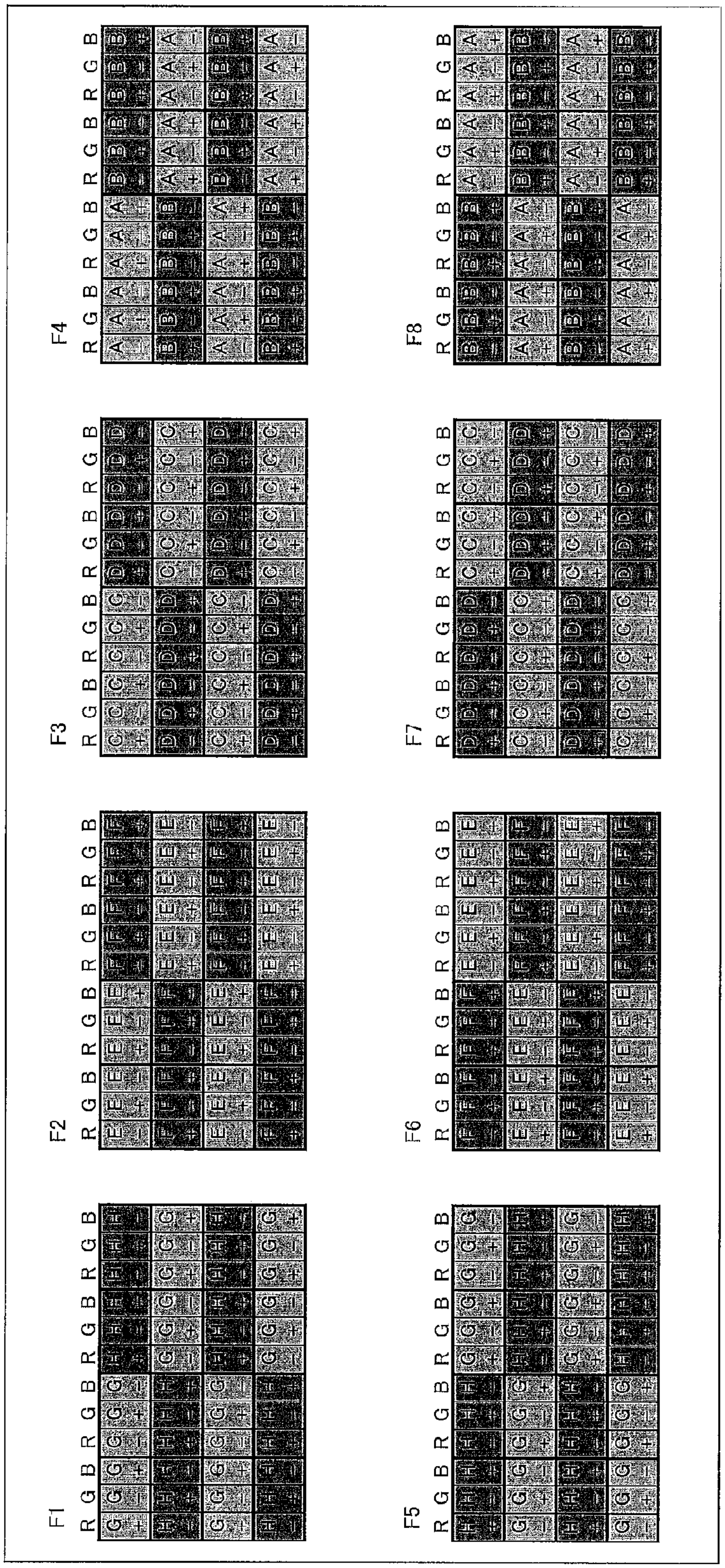
FIG. 25 is a diagram illustrating still another example arrangement of first pixels in accordance with an embodiment of the present invention.

FIG. 25 illustrates a state of (i) a first pixel involving the gamma curves of γG->γE->γC->γA->γH->γF->γD->γB in the sequence of bright->bright->bright->bright->dark->dark->dark->dark, respectively, and (ii) a first pixel involving the gamma curves of γH->γF->γD->γB->γG->γE->γC->γA in the sequence of dark->dark->dark->dark->bright->bright->bright->bright, respectively, the first pixels being driven at 240 Hz under the conditions of A (number of frames per cycle)=8, N=4, and M=4, and being arranged alternatively so that during a single frame and for each data color, (i) a pair of bright pixels are adjacent to each other in the row direction and (ii) a pair of dark pixels are adjacent to each other in the row direction. The gray scale data has a polarity subjected to dot inversion. This arrangement completes luminance averaging at 30 Hz, and can thus effectively prevent patterns from overlapping one another. A greater effect is produced with a smaller number of frames necessary for luminance averaging. Further, the above arrangement allows pixels having an identical color to be present during each frame in (i) a first number for the positive polarity in the sequence and (ii) a second number for the negative polarity in the sequence, the first and second numbers being equal to each other. The above arrangement thus eliminates polarity bias in each sequence for a monochrome display, and reduces the occurrence of a flicker.

Figure 26:
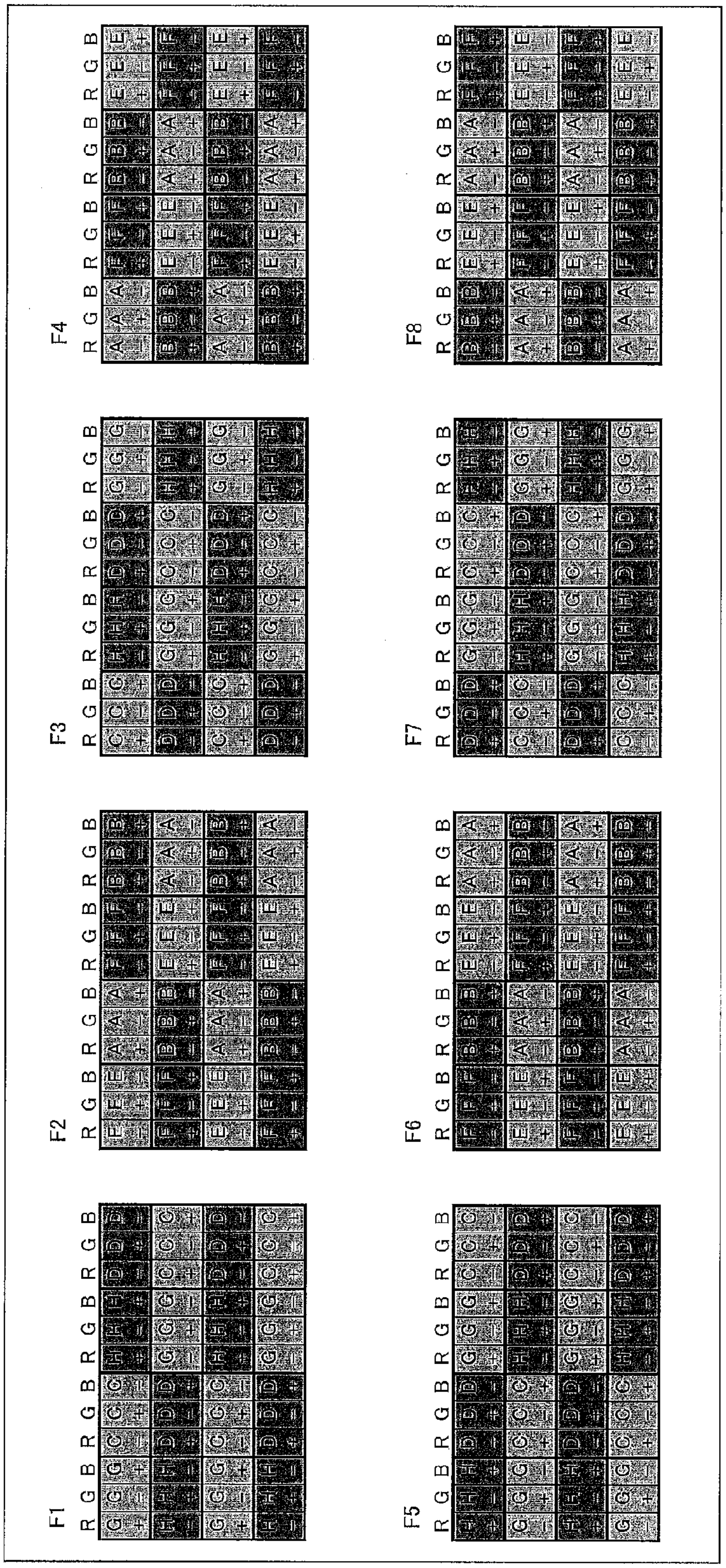
FIG. 26 is a diagram illustrating still another example arrangement of first pixels in accordance with an embodiment of the present invention.

FIG. 26 illustrates a state of (i) a first pixel involving the gamma curves of γG->γE->γC->γA->γH->γF->γD->γB in the sequence of bright->bright->bright->bright->dark-22 dark->dark->dark, respectively, (ii) a first pixel involving the gamma curves of γC->γA->γH->γF->γD->γB->γG->γE in the sequence of bright->bright->dark->dark->dark->dark->bright->bright, respectively, (iii) a first pixel involving the gamma curves of γH->γF->γD->γB->γG->γE->γC->γA in the sequence of dark->dark->dark->dark->bright->bright->bright->bright, respectively, and (iv) a first pixel involving the gamma curves of γD->γB->γG->γE->γC->γA->γH->γF in the sequence of dark->dark->bright->bright->bright->bright->dark->dark, respectively, the first pixels being driven at 240 Hz under the conditions of A (number of frames per cycle)=8, N=4, and M=4, and being arranged alternatively in the row direction and the column direction so that during a single frame and for each data color, (i) a pair of bright pixels are adjacent to each other in the row direction and (ii) a pair of dark pixels are adjacent to each other in the row direction. The gray scale data has a polarity subjected to dot inversion. This arrangement completes luminance averaging at 30 Hz, and can thus effectively prevent patterns from overlapping one another. A greater effect is produced with a smaller number of frames necessary for luminance averaging. Further, the above arrangement allows pixels having an identical color to be present during each frame in (i) a first number for the positive polarity in the sequence and (ii) a second number for the negative polarity in the sequence, the first and second numbers being equal to each other. The above arrangement thus eliminates polarity bias in each sequence for a monochrome display, and reduces the occurrence of a flicker. The above arrangement also allows pixels having an identical color to be present during each frame in (i) a first number for the positive polarity in the sequence and (ii) a second number for the negative polarity in the sequence, the first and second numbers being equal to each other. The above arrangement thus eliminates polarity bias in each sequence for a monochrome display, and reduces the occurrence of a flicker.

The respective arrangements of FIGS. 25 and 26 each involve an arrangement pattern in which first pixels that are identical in data color and different in write bias during each frame are present in respective numbers for the different polarities, the numbers being equal to each other. The above arrangements each allow first pixels having the positive polarity to be equal in number to first pixels having the negative polarity in a single arrangement pattern for each data color, and can thus advantageously reduce the occurrence of a flicker attributed to polarity bias.

FIGS. 27 through 34 each illustrate an Example of a combination of the arrangement of first pixels and a sequence.

Figure 28:
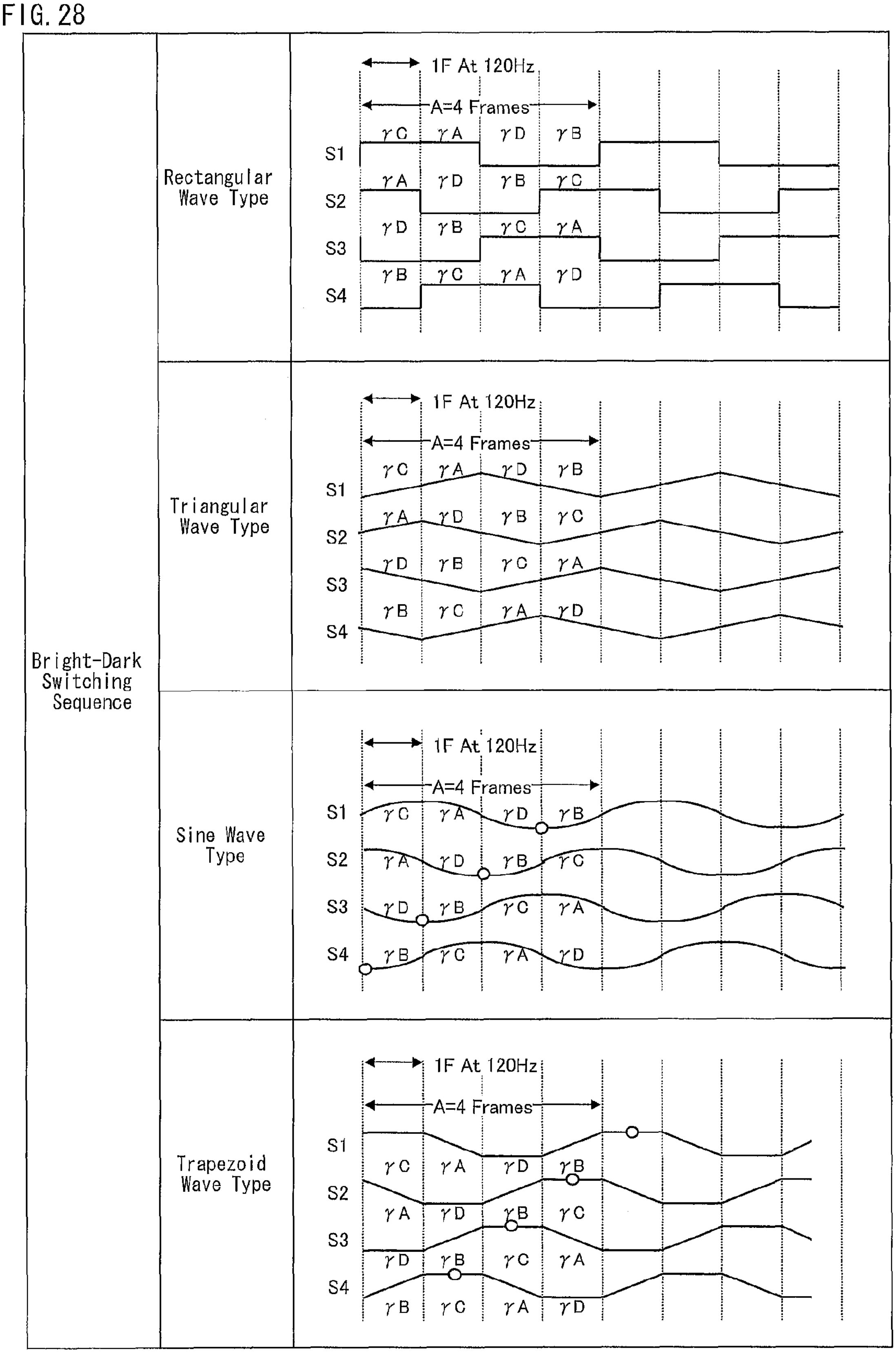
FIG. 28 is a diagram illustrating luminance change patterns for the combination in FIG. 27.

FIGS. 27 and 28 illustrate a case of A=4, Q1=1, Q2=0, N=6 and 2, M=2, a driving frequency of 120 Hz, and a bright-dark switching cycle of 30 Hz. FIGS. 27 and 28 illustrate two instances: one in which each picture element includes R, G, and B sharing a common sequence (N=6) and one in which each picture element includes R, G, and B having respective sequences independent of one another (N=2). This case involves a luminance change pattern in the form of, for example, a rectangular wave, a triangular wave, a sine wave, or a trapezoid wave. Further, this case involves, for individual frames, respective gamma curves independent of one another.

Figure 30:
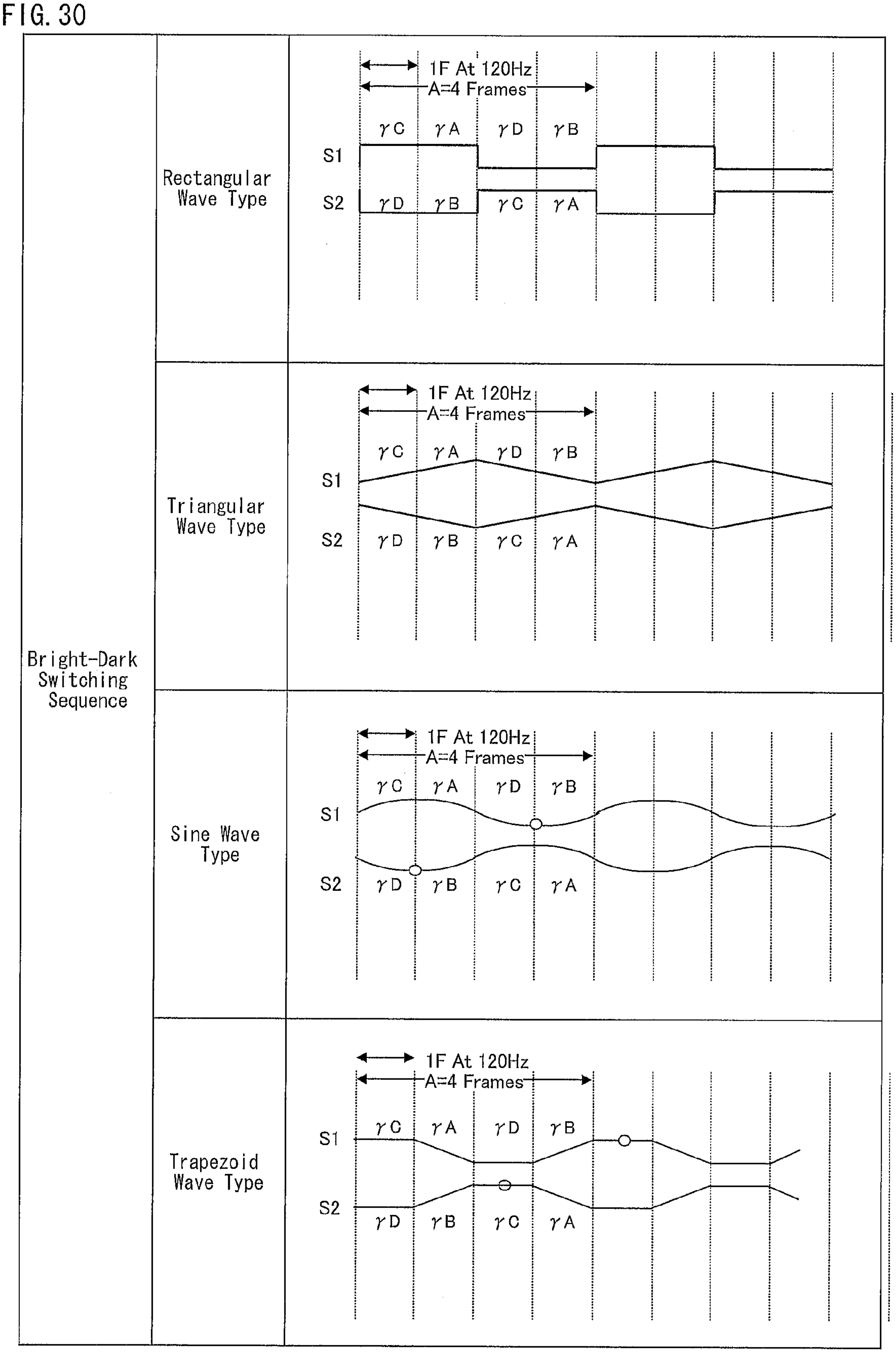
FIG. 30 is a diagram illustrating luminance change patterns for the combination in FIG. 29.

FIGS. 29 and 30 illustrate a case of A=4, Q1=0, Q2=0, N=2, M=2, a driving frequency of 120 Hz, and a bright-dark switching cycle of 30 Hz. FIGS. 29 and 30 illustrate two instances: one in which each picture element includes R, G, and B sharing a common sequence and one in which each picture element includes R, G, and B having respective sequences independent of one another. This case involves a luminance change pattern in the form of, for example, a rectangular wave, a triangular wave, a sine wave, or a trapezoid wave. Further, this case involves, for individual frames, respective gamma curves independent of one another.

Figure 32:
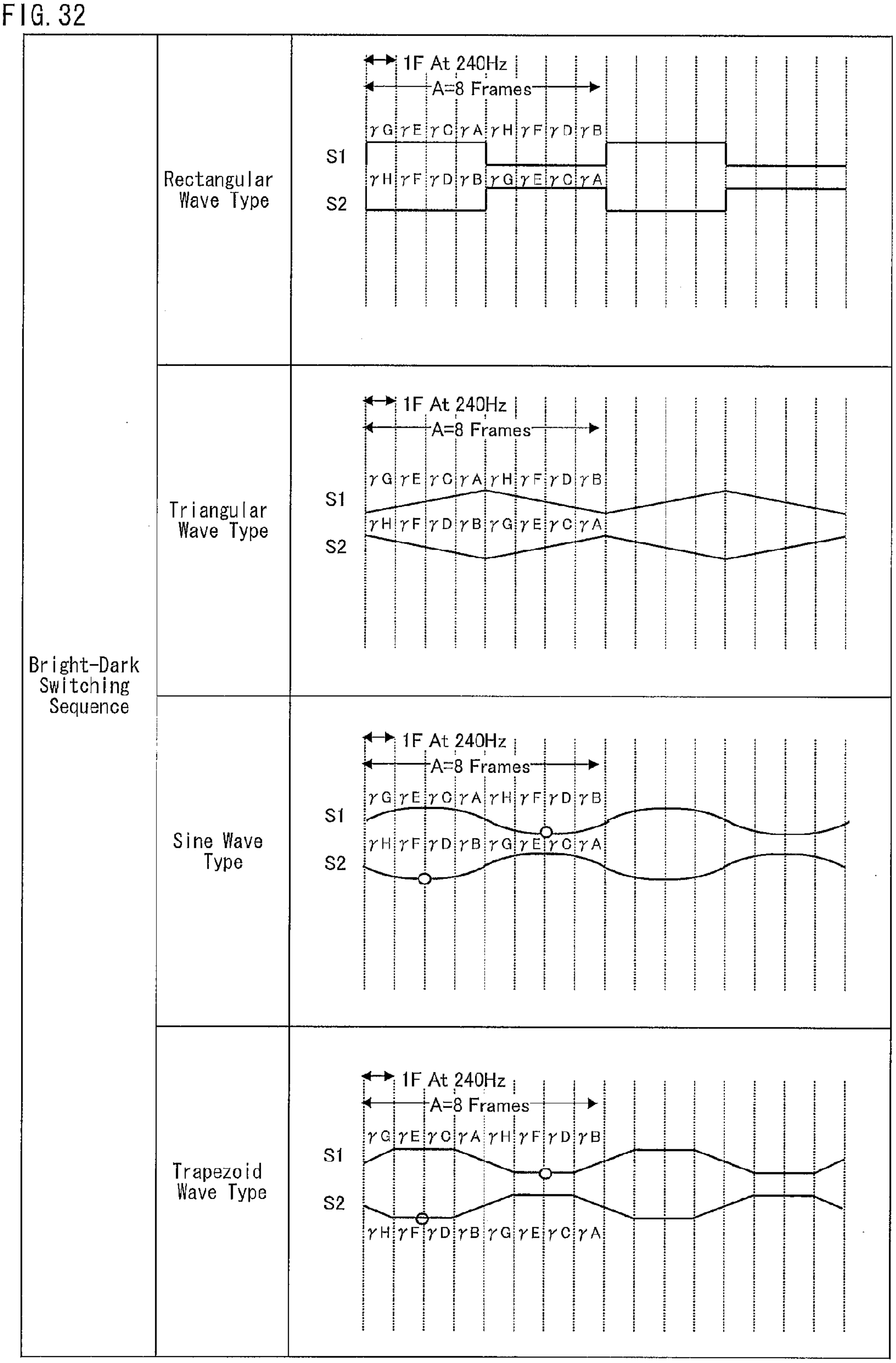
FIG. 32 is a diagram illustrating luminance change patterns for the combination in FIG. 31.

FIGS. 31 and 32 illustrate a case of A=8, Q1=0, Q2=0, N=4, M=4, a driving frequency of 240 Hz, and a bright-dark switching cycle of 30 Hz. FIGS. 31 and 32 illustrate two instances: one in which each picture element includes R, G, and B sharing a common sequence and one in which each picture element includes R, G, and B having respective sequences independent of one another. This case involves a luminance change pattern in the form of, for example, a rectangular wave, a triangular wave, a sine wave, or a trapezoid wave. Further, this case involves, for individual frames, respective gamma curves independent of one another.

Figure 34:
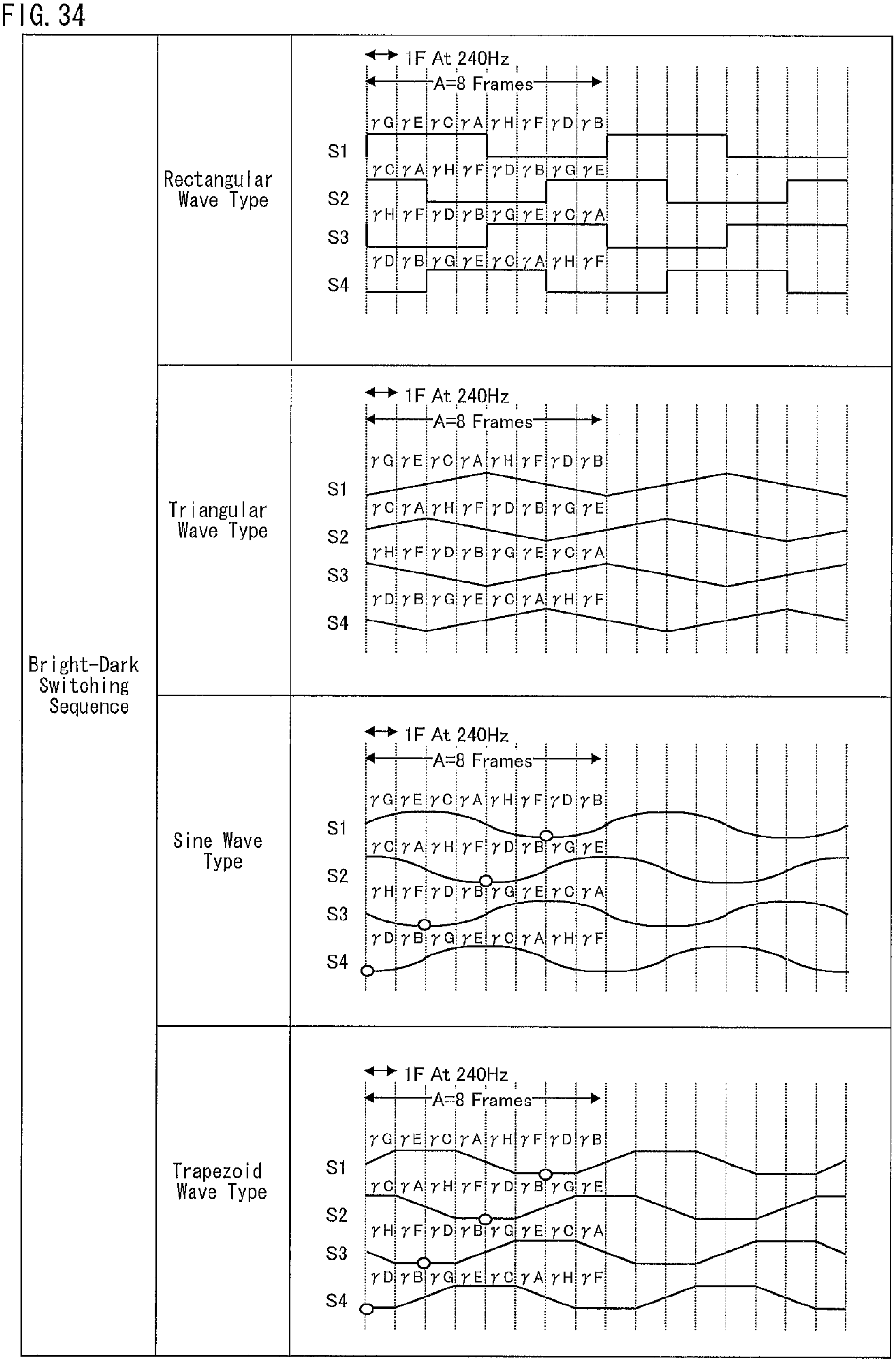
FIG. 34 is a diagram illustrating luminance change patterns for the combination in FIG. 33.

FIGS. 33 and 34 illustrate a case of A=8, Q1=0, Q2=0, N=4, M=4, a driving frequency of 240 Hz, and a bright-dark switching cycle of 30 Hz. FIGS. 33 and 34 illustrate two instances: one in which each picture element includes R, G, and B sharing a common sequence and one in which each picture element includes R, G, and B having respective sequences independent of one another. This case involves a luminance change pattern in the form of, for example, a rectangular wave, a triangular wave, a sine wave, or a trapezoid wave. Further, this case involves, for individual frames, respective gamma curves independent of one another.

Figure 35:
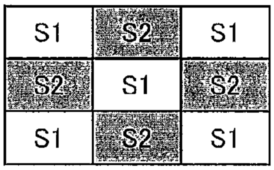
FIG. 35 is a diagram illustrating an example arrangement of first pixels in accordance with an embodiment of the present invention.
Figure 36:
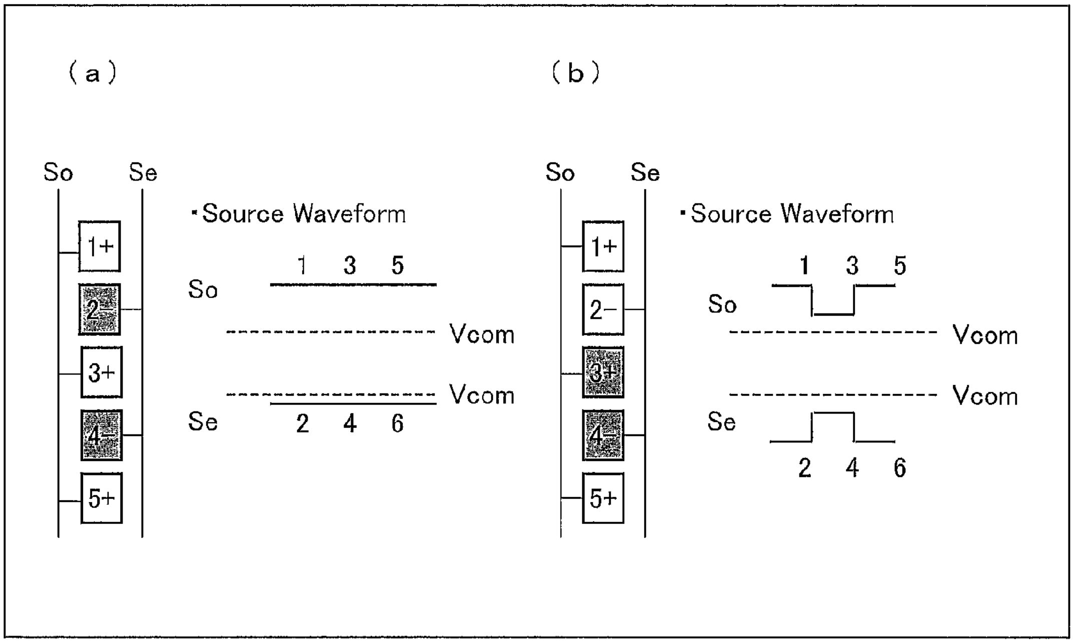
FIG. 36 is a diagram illustrating, in accordance with an embodiment of the present invention, a relation between the polarity of a first pixel and a data signal line connected to the first pixel, where (a) and (b) illustrate connections different from each other.
Figure 37:
FIG. 37 is a diagram illustrating an example still image in accordance with an embodiment of the present invention.
Figure 38:
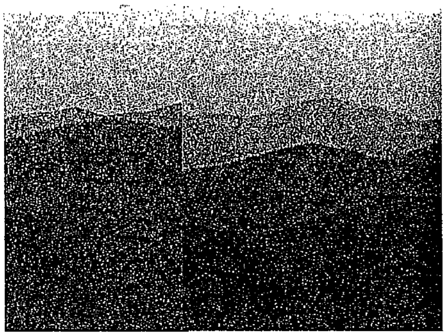
FIG. 38 is a diagram illustrating, in accordance with an embodiment of the present invention, how no noise patterns overlap each other when the still image in FIG. 37 is scrolled.

In the present embodiment, N and M (that is, X) are preferably each an even number. If the arrangement pattern has an arrangement cycle having odd numbers (N=3 and M=3) as illustrated in FIG. 35, the sequences S1 and S2 cannot be set in an equal number in each array direction and over the entire first-pixel region. This will cause bright pixels to be unequal in number to dark pixels between frames, and may cause a flicker. With each of N and M (that is, X) being an even number, bright pixels are equal in number to dark pixels, which can suitably prevent a flicker.

In the case where (i) there are two kinds of sequence for the column direction (that is, a signal line direction) as in the arrangement pattern U2 of FIG. 1 and (ii) a positive-polarity first pixel and a negative-polarity first pixel are arranged alternately for each frame, first pixels sharing an identical polarity are desirably connected to a single data signal line. For example, as illustrated in (a) of FIG. 36, (i) a data signal (So) for an odd-numbered line has a positive polarity constantly during a frame and a negative polarity constantly during the following frame, while (ii) a data signal (Se) for an even-numbered line has a negative polarity constantly during a frame and a positive polarity constantly during the following frame. This arrangement simply needs to supply a data signal with a single polarity during one frame period, and thus allows (i) the data signal to be small in amplitude as indicated by the flat positive and negative source waveforms and (ii) the source waveforms to be low in frequency. On the other hand, in the case where the data signal (So) for an odd-numbered line and the data signal (Se) for an even-numbered line each have both polarities during one frame period as illustrated in (b) of FIG. 36, the data signal has a large amplitude for each of positive and negative source waveforms. The four-dot cycle arrangement illustrated in FIG. 36 requires a time unit of 1H for an amplitude to achieve a “killer” drive state.

A high-speed drive (for example, a 120-Hz drive or a 240-Hz drive) and a high resolution panel (for example, FHD or 2k4k) each involve a source (data) signal having a high frequency, which leads to (i) the problem of influence by waveform distortion due to a panel load and (ii) the problem of heat generated by a source driver. Shortening the source amplitude cycle allows the above drive to be achieved. A source typically has a polarity inversion cycle set within the range from several H or more to one frame. Pixels are, however, preferably arranged, for a better display quality, such that the respective polarities are inverted from one another in a dot-checkered pattern. Thus, a data signal line is, for example, provided for each of an odd-numbered scan line and an even-numbered scan line as illustrated in (a) of FIG. 36, so that both (i) the data signal has a shortened amplitude cycle and (ii) the pixel polarities are arranged in a dot-checkered pattern.

N and M are preferably each set so that the cycle of 2×N frames and the cycle of 2×M frames are each repeated at 24 Hz or higher. Averaging luminance for a pattern requires either 2×N frames or 2×M frames. Thus, larger N and M require a longer time for the averaging, which may cause, for example, a flicker to be visually recognized. The luminance averaging desirably requires only a small number of frames, while the cycle of 2×N frames and the cycle of 2×M frames desirably each have a high frequency. Actual testing and studying indicate that the cycle of 2×N frames and the cycle of 2×M frames desirably each have a frequency of 24 Hz or higher.

Further, A preferably represents an even number of frames which even number is four or greater. A=1 to 3 is not preferable for the following reason: With A=1, a frame cycle of 1 F causes no luminance change. With A=2, the number B of kinds of sequence is only two at its maximum (S1: bright->dark, and S2: dark->bright). In the case of B=1, luminance is switched over the entire screen, which causes a flicker. In the case of B=2, arrangement cycles that satisfy the above conditions are N and M=1, 3, 5 . . . , which does not allow pixels to be arranged in such a manner that the two kinds of sequence are present in an equal number. In the case of B=2, a flicker is caused as in, for example, the above arrangement pattern of FIG. 35. With A=3, neither of the arrangement cycles M and N is an integer.

In a first-pixel region, A multiplied by one frame period may yield a length that is (i) longer than 1/70 second and (ii) shorter than a value obtained by multiplying 1/30 second by the number of the plurality of sequences included in the above arrangement pattern. This arrangement allows a scroll image to be displayed smoothly, and can also prevent a viewer from recognizing a flicker caused by a brightness change.

The number of sequences in a first-pixel region may be A/2 raised to the R-th power (where R is a positive integer). This arrangement more suitably prevents overlapping of noises in a scroll image.

The display device of the present invention may be a different device such as an EL display device.

As described above, in order to solve the above problem, a display device of the present invention is an active matrix display device including: regions each including an arrangement of first pixels each changing, in order to display a gray level for a period, its luminance in a sequence repeating a luminance change pattern of A frames (where A is an even number) through a cycle of the A frames, wherein: the sequence includes, in each of the regions, a plurality of sequences that are shifted from one another in the luminance change pattern along a time axis direction and that are defined for the each of the regions, one of the plurality of sequences being allotted to each of the first pixels in the each of the regions; for the each of the first pixels, each jth frame corresponding to at least one integer j (where $1 \leq j \leq A$) for each of the A frames has, in a corresponding sequence, a luminance having a first mean value that is different from a second mean value of a luminance, in the corresponding sequence, of a frame occurring A/2 frames after the jth frame; the first pixels are provided in correspondence with each of data colors each as a constituent element of a display color, the data colors including an achromatic color; and assuming that a row direction and a column direction are each an array direction, the each of the regions includes an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for the each of the regions.

According to the above arrangement, X is found by multiplying A/2 by an odd number. In the case where (i) a scroll image moves by a predetermined number of dots per frame and (ii) with a unit of N consecutive frames, two adjacent units of such N frames are respectively a first-half period $\alpha$ and a second-half period $\beta$, the number of frames during each of which, among X, each pixel at a visual point has a luminance level for a bright pixel is, during a period $\alpha+\beta$, equal (=N) to the number of frames during each of which the pixel at a visual point has a luminance level for a dark pixel. With this arrangement, there is an offset between brightnesses viewed by the viewer as afterimages through the period $\alpha+\beta$ during an image scroll.

The above arrangement thus allows an image that is uniform in luminance to be obtained by combining, throughout a scroll period, respective images displayed by pixels each at a visual point. This indicates that (i) in the case where constant gray scale data is continuously inputted, an image with a uniform gray level is observed by a scroll as well, and that (ii) a scroll causes no particular noise pattern.

Consequently, the above arrangement advantageously provides a display device which can provide an arrangement in which, when an image is scrolled, a noise pattern does not easily overlap the image.

In order to solve the above problem, the display device of the present invention may be arranged such that for the each of the first pixels, the plurality of sequences each have a luminance having a mean value that, for each of jth frames corresponding to respective integers j (where $1 \leq j \leq A$) for each of the A frames, falls between (i) the first mean value and (ii) the second mean value, except that in a case where the first mean value and the second mean value are equal to each other, the mean value of the luminance of each of the plurality of sequences is equal to the first and second mean values.

The above arrangement can advantageously offset brightnesses of a scroll image appropriately with use of (i) a frame with a luminance having a value higher than the mean value of the luminance for a sequence and (ii) a frame with a luminance having a value lower than the mean value of the luminance for the sequence.

In order to solve the above problem, the display device of the present invention may be arranged such that at least one of the regions includes the arrangement pattern in which Q=0.

The above arrangement reduces the number of first pixels making up an arrangement pattern in which X=A/2, and can thus more suitably prevent overlapping of noises in a scroll image.

In order to solve the above problem, the display device of the present invention may be arranged such that in at least one of the regions, A/2 is an even number of 2 or greater.

The above arrangement advantageously makes it possible to create a desired luminance change pattern without causing a flicker.

In order to solve the above problem, the display device of the present invention may be arranged such that at least one of the regions includes the arrangement pattern including first pixels changing their respective luminances in respective sequences that are shifted from each other in the luminance change pattern along the time axis direction by A/2 frames.

The above arrangement can more suitably prevent overlapping of noises in a scroll image.

In order to solve the above problem, the display device of the present invention may be arranged such that in at least one of the regions, (i) the plurality of sequences are two sequences, and (ii) for each frame, a positive-polarity data signal is written to a first pixel changing its luminance in a first one of the two sequences, and a negative-polarity data signal is written to a first pixel changing its luminance in a second one of the two sequences.

The above arrangement advantageously makes it possible to supply, to first pixels in an arrangement pattern along the column direction, a data signal that is small in amplitude and frequency.

In order to solve the above problem, the display device of the present invention may be arranged such that in at least one of the regions, (i) the array direction is the column direction, (ii) the plurality of sequences are two sequences that satisfy X=2, and (iii) for each frame, a first pixel having a positive write polarity and a first pixel having a negative write polarity are arranged alternately, and first pixels sharing an identical write polarity are connected to a single data signal line.

The above arrangement advantageously makes it possible to supply, to first pixels in an arrangement pattern along the column direction, a data signal that is small in amplitude and frequency.

In order to solve the above problem, the display device of the present invention may be arranged such that in at least one of the regions, A multiplied by one frame period yields a length that is (i) longer than 1/70 second and (ii) shorter than 1/30 second multiplied by a number of the plurality of sequences included in the arrangement pattern.

The above arrangement advantageously allows a scroll image to be displayed smoothly, and can also prevent a viewer from recognizing a flicker caused by a brightness change.

In order to solve the above problem, the display device of the present invention may be arranged such that in at least one of the regions, a number of the plurality of sequences is A/2 raised to an R-th power (where R is a positive integer).

The above arrangement can more suitably prevent overlapping of noises in a scroll image.

In order to solve the above problem, the display device of the present invention may be arranged such that X is an even number.

The above arrangement can advantageously prevent a flicker in a scroll image.

In order to solve the above problem, the display device of the present invention may be arranged such that a period of 2× frames is repeated at 24 Hz or higher.

The above arrangement can suitably average the luminance in a scroll image, and thus prevent a flicker.

In order to solve the above problem, the display device of the present invention may be arranged such that in at least one of the regions, the arrangement pattern includes, for each frame, (i) a first group of first pixels each changing its luminance in a sequence, the first group having a write polarity, and (ii) a second group of first pixels each changing its luminance in the sequence for the first group, the second group having a write polarity different from the write polarity for the first group, the first pixels in the first group being equal in number to the first pixels in the second group.

According to the above arrangement, the number of positive-polarity first pixels included in an arrangement pattern and each changing its luminance in a sequence is equal to the number of negative-polarity first pixels included in the same arrangement pattern and each changing its luminance in the same sequence. The above arrangement can thus reduce the occurrence of a flicker attributed to polarity bias.

In order to solve the above problem, the display device of the present invention may be arranged such that in at least one of the regions, the arrangement pattern includes, for each frame, (i) a third group of first pixels, the third group having a data color and a write polarity, and (ii) a fourth group of first pixels, the fourth group having the data color for the third group and a write polarity different from the write polarity for the third group, the first pixels in the third group being equal in number to the first pixels in the fourth group.

According to the above arrangement, the number of positive-polarity first pixels included in an arrangement pattern is equal for each data color to the number of negative-polarity first pixels included in the same arrangement pattern. The above arrangement can thus reduce the occurrence of a flicker attributed to polarity bias.

In order to solve the above problem, the display device of the present invention may be arranged such that the luminance change pattern is in a form of a rectangular wave.

The above arrangement makes it possible to easily obtain an average luminance for the first pixels on the basis of a luminance change pattern indicative of brightness.

In order to solve the above problem, the display device of the present invention may be arranged such that the luminance change pattern is in a form of a triangular wave.

The above arrangement makes it possible to easily obtain an average luminance for the first pixels on the basis of a waveform involving, for example, use of the response speed of a display element.

In order to solve the above problem, the display device of the present invention may be arranged such that the luminance change pattern is in a form of a sine wave.

The above arrangement makes it possible to easily obtain an average luminance for the first pixels on the basis of a waveform involving, for example, use of the response speed of a display element.

In order to solve the above problem, the display device of the present invention may be arranged such that the luminance change pattern is in a form of a trapezoid wave.

The above arrangement makes it possible to easily obtain an average luminance for the first pixels on the basis of a waveform involving, for example, use of the response speed of a display element.

In order to solve the above problem, a display device driving method of the present invention is a display device driving method for driving an active matrix display device, the display device driving method including: creating regions each including an arrangement of first pixels each changing, in order to display a gray level for a period, its luminance in a sequence repeating a luminance change pattern of A frames (where A is an even number) through a cycle of the A frames; causing the sequence to include, in each of the regions, a plurality of sequences that are shifted from one another in the luminance change pattern along a time axis direction and that are defined for the each of the regions, one of the plurality of sequences being allotted to each of the first pixels in the each of the regions; causing, for the each of the first pixels, each jth frame corresponding to at least one integer j (where 1≤j≤A) for each of the A frames to have, in a corresponding sequence, a luminance having a first mean value that is different from a second mean value of a luminance, in the corresponding sequence, of a frame occurring A/2 frames after the jth frame; providing the first pixels in correspondence with each of data colors each as a constituent element of a display color, the data colors including an achromatic color; and causing, assuming that a row direction and a column direction are each an array direction, the each of the regions to include an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for the each of the regions.

According to the above arrangement, X is found by multiplying A/2 by an odd number. In the case where (i) a scroll image moves by a predetermined number of dots per frame and (ii) with a unit of N consecutive frames, two adjacent units of such N frames are respectively a first-half period $\alpha$ and a second-half period $\beta$, the number of frames during each of which, among X, each pixel at a visual point has a luminance level for a bright pixel is, during a period $\alpha+\beta$, equal (=N) to the number of frames during each of which the pixel at a visual point has a luminance level for a dark pixel. With this arrangement, there is an offset between brightnesses viewed by the viewer as afterimages through the period $\alpha+\beta$ during an image scroll.

The above arrangement thus allows an image that is uniform in luminance to be obtained by combining, throughout a scroll period, respective images displayed by pixels each at a visual point. This indicates that (i) in the case where constant gray scale data is continuously inputted, an image with a uniform gray level is observed by a scroll as well, and that (ii) a scroll causes no particular noise pattern.

Consequently, the above arrangement advantageously provides a display device driving method which can provide an arrangement in which, when an image is scrolled, a noise pattern does not easily overlap the image.

In order to solve the above problem, the display device driving method of the present invention may be arranged such that for the each of the first pixels, the plurality of sequences are each caused to have a luminance having a mean value that, for each of jth frames corresponding to respective integers j (where $1\leq j\leq A$) for each of the A frames, falls between (i) the first mean value and (ii) the second mean value, except that in a case where the first mean value and the second mean value are equal to each other, the mean value of the luminance of each of the plurality of sequences is caused to be equal to the first and second mean values.

The above arrangement can advantageously offset brightnesses of a scroll image appropriately with use of (i) a frame with a luminance having a value higher than the mean value of the luminance for a sequence and (ii) a frame with a luminance having a value lower than the mean value of the luminance for the sequence.

In order to solve the above problem, the display device driving method of the present invention may be arranged such that at least one of the regions is caused to include the arrangement pattern in which Q=0.

The above arrangement reduces the number of first pixels making up an arrangement pattern in which X=A/2, and can thus more suitably prevent overlapping of noises in a scroll image.

In order to solve the above problem, the display device driving method of the present invention may be arranged such that in at least one of the regions, A/2 is an even number of 2 or greater.

The above arrangement advantageously makes it possible to create a desired luminance change pattern without causing a flicker.

In order to solve the above problem, the display device driving method of the present invention may be arranged such that at least one of the regions is caused to include the arrangement pattern including first pixels changing their respective luminances in respective sequences that are shifted from each other in the luminance change pattern along the time axis direction by A/2 frames.

The above arrangement can more suitably prevent overlapping of noises in a scroll image.

In order to solve the above problem, the display device driving method of the present invention may be arranged such that in at least one of the regions, (i) the plurality of sequences are two sequences, and (ii) for each frame, a positive-polarity data signal is written to a first pixel changing its luminance in a first one of the two sequences, and a negative-polarity data signal is written to a first pixel changing its luminance in a second one of the two sequences.

The above arrangement advantageously makes it possible to supply, to first pixels in an arrangement pattern along the column direction, a data signal that is small in amplitude and frequency.

In order to solve the above problem, the display device driving method of the present invention may be arranged such that in at least one of the regions, (i) the array direction is the column direction, (ii) the plurality of sequences are two sequences that satisfy X=2, and (iii) for each frame, a first pixel having a positive write polarity and a first pixel having a negative write polarity are arranged alternately, and first pixels sharing an identical write polarity are connected to a single data signal line.

The above arrangement advantageously makes it possible to supply, to first pixels in an arrangement pattern along the column direction, a data signal that is small in amplitude and frequency.

In order to solve the above problem, the display device driving method of the present invention may be arranged such that in at least one of the regions, A multiplied by one frame period yields a length that is (i) longer than 1/70 second and (ii) shorter than 1/30 second multiplied by a number of the plurality of sequences included in the arrangement pattern.

The above arrangement advantageously allows a scroll image to be displayed smoothly, and can also prevent a viewer from recognizing a flicker caused by a brightness change.

In order to solve the above problem, the display device driving method of the present invention may be arranged such that in at least one of the regions, a number of the plurality of sequences is A/2 raised to an R-th power (where R is a positive integer).

The above arrangement can more suitably prevent overlapping of noises in a scroll image.

In order to solve the above problem, the display device driving method of the present invention may be arranged such that X is an even number.

The above arrangement can advantageously prevent a flicker in a scroll image.

In order to solve the above problem, the display device driving method of the present invention may be arranged such that a period of 2× frames is repeated at 24 Hz or higher.

The above arrangement can suitably average the luminance in a scroll image, and thus prevent a flicker.

In order to solve the above problem, the display device driving method of the present invention may be arranged such that in at least one of the regions, the arrangement pattern includes, for each frame, (i) a first group of first pixels each changing its luminance in a sequence, the first group having a write polarity, and (ii) a second group of first pixels each changing its luminance in the sequence for the first group, the second group having a write polarity different from the write polarity for the first group, the first pixels in the first group being equal in number to the first pixels in the second group.

According to the above arrangement, the number of positive-polarity first pixels included in an arrangement pattern and each changing its luminance in a sequence is equal to the number of negative-polarity first pixels included in the same arrangement pattern and each changing its luminance in the same sequence. The above arrangement can thus reduce the occurrence of a flicker attributed to polarity bias.

In order to solve the above problem, the display device driving method of the present invention may be arranged such that in at least one of the regions, the arrangement pattern includes, for each frame, (i) a third group of first pixels, the third group having a data color and a write polarity, and (ii) a fourth group of first pixels, the fourth group having the data color for the third group and a write polarity different from the write polarity for the third group, the first pixels in the third group being equal in number to the first pixels in the fourth group.

According to the above arrangement, the number of positive-polarity first pixels included in an arrangement pattern is equal for each data color to the number of negative-polarity first pixels included in the same arrangement pattern. The above arrangement can thus reduce the occurrence of a flicker attributed to polarity bias.

In order to solve the above problem, the display device driving method of the present invention may be arranged such that the luminance change pattern is in a form of a rectangular wave.

The above arrangement makes it possible to easily obtain an average luminance for the first pixels on the basis of a luminance change pattern indicative of brightness.

In order to solve the above problem, the display device driving method of the present invention may be arranged such that the luminance change pattern is in a form of a triangular wave.

The above arrangement makes it possible to easily obtain an average luminance for the first pixels on the basis of a waveform involving, for example, use of the response speed of a display element.

In order to solve the above problem, the display device driving method of the present invention may be arranged such that the luminance change pattern is in a form of a sine wave.

The above arrangement makes it possible to easily obtain an average luminance for the first pixels on the basis of a waveform involving, for example, use of the response speed of a display element.

In order to solve the above problem, the display device driving method of the present invention may be arranged such that the luminance change pattern is in a form of a trapezoid wave.

The above arrangement makes it possible to easily obtain an average luminance for the first pixels on the basis of a waveform involving, for example, use of the response speed of a display element.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The present invention is suitably applicable to a liquid crystal display device, in particular.

The invention claimed is:

1. An active matrix display device comprising:

regions each including an arrangement of first pixels each changing, in order to display a gray level for a period, its luminance in a sequence repeating a luminance change pattern of A frames (where A is an even number) through a cycle of the A frames, wherein:

the sequence includes, in each of the regions, a plurality of sequences that are shifted from one another in the luminance change pattern along a time axis direction and that are defined for said each of the regions, one of the plurality of sequences being allotted to each of the first pixels in said each of the regions;

for said each of the first pixels, each jth frame corresponding to at least one integer j (where $1 \leq j \leq A$) for each of the A frames has, in a corresponding sequence, a luminance having a first mean value that is different from a second mean value of a luminance, in the corresponding sequence, of a frame occurring A/2 frames after the jth frame;

the first pixels are provided in correspondence with each of data colors each as a constituent element of a display color, the data colors including an achromatic color; and assuming that a row direction and a column direction are each an array direction, said each of the regions includes an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for said each of the regions.

2. The display device according to claim 1, wherein:

for said each of the first pixels, the plurality of sequences each have a luminance having a mean value that, for each of jth frames corresponding to respective integers j (where $1 \leq j \leq A$) for each of the A frames, falls between (i) the first mean value and (ii) the second mean value, except that in a case where the first mean value and the second mean value are equal to each other, the mean value of the luminance of each of the plurality of sequences is equal to the first and second mean values.

3. The display device according to claim 1, wherein:

at least one of the regions includes the arrangement pattern in which Q=0.

4. The display device according to claim 1, wherein:

in at least one of the regions, A/2 is an even number of 2 or greater.

5. The display device according to claim 4, wherein:

at least one of the regions includes the arrangement pattern including first pixels changing their respective luminances in respective sequences that are shifted from each other in the luminance change pattern along the time axis direction by A/2 frames.

6. The display device according to claim 1, wherein:

in at least one of the regions, (i) the plurality of sequences are two sequences, and (ii) for each frame, a positive-polarity data signal is written to a first pixel changing its luminance in a first one of the two sequences, and a negative-polarity data signal is written to a first pixel changing its luminance in a second one of the two sequences.

7. The display device according to claim 1, wherein:

in at least one of the regions, (i) the array direction is the column direction, (ii) the plurality of sequences are two sequences that satisfy X=2, and (iii) for each frame, a first pixel having a positive write polarity and a first pixel having a negative write polarity are arranged alternately, and first pixels sharing an identical write polarity are connected to a single data signal line.

8. The display device according to claim 1, wherein:

in at least one of the regions, A multiplied by one frame period yields a length that is (i) longer than 1/70 second and (ii) shorter than 1/30 second multiplied by a number of the plurality of sequences included in the arrangement pattern.

9. The display device according to claim 1, wherein:

in at least one of the regions, a number of the plurality of sequences is A/2 raised to an R-th power (where R is a positive integer).

10. The display device according to claim 1, wherein:

X is an even number.

11. The display device according to claim 1, wherein:

a period of 2X frames is repeated at 24 Hz or higher.

12. The display device according to claim 1, wherein:

in at least one of the regions, the arrangement pattern includes, for each frame, (i) a first group of first pixels each changing its luminance in a sequence, the first group having a write polarity, and (ii) a second group of first pixels each changing its luminance in the sequence for the first group, the second group having a write polarity different from the write polarity for the first group, the first pixels in the first group being equal in number to the first pixels in the second group.

13. The display device according to claim 1, wherein:

in at least one of the regions, the arrangement pattern includes, for each frame, (i) a third group of first pixels, the third group having a data color and a write polarity, and (ii) a fourth group of first pixels, the fourth group having the data color for the third group and a write polarity different from the write polarity for the third group, the first pixels in the third group being equal in number to the first pixels in the fourth group.

14. The display device according to claim 1, wherein:

the luminance change pattern is in a form of a rectangular wave.

15. The display device according to claim 1, wherein:

the luminance change pattern is in a form of a triangular wave.

16. The display device according to claim 1, wherein:

the luminance change pattern is in a form of a sine wave.

17. The display device according to claim 1, wherein:

the luminance change pattern is in a form of a trapezoid wave.

18. A display device driving method for driving an active matrix display device, the display device driving method comprising:

creating regions each including an arrangement of first pixels each changing, in order to display a gray level for a period, its luminance in a sequence repeating a luminance change pattern of A frames (where A is an even number) through a cycle of the A frames;

causing the sequence to include, in each of the regions, a plurality of sequences that are shifted from one another in the luminance change pattern along a time axis direction and that are defined for said each of the regions, one of the plurality of sequences being allotted to each of the first pixels in said each of the regions;

causing, for said each of the first pixels, each jth frame corresponding to at least one integer j (where $1 \leq j \leq A$) for each of the A frames to have, in a corresponding sequence, a luminance having a first mean value that is different from a second mean value of a luminance, in the corresponding sequence, of a frame occurring A/2 frames after the jth frame;

providing the first pixels in correspondence with each of data colors each as a constituent element of a display color, the data colors including an achromatic color; and causing, assuming that a row direction and a column direction are each an array direction, said each of the regions to include an arrangement pattern including, for each of at least one array direction and for each of the data colors, X first pixels arranged next to one another in the array direction, the arrangement pattern being repeated in the array direction, the X being represented by $$X=A/2+A\cdot Q,$$

where Q is an integer of 0 or greater and is defined for said each of the regions.

19. The display device driving method according to claim 18, wherein:

for said each of the first pixels, the plurality of sequences are each caused to have a luminance having a mean value that, for each of jth frames corresponding to respective integers j (where $1 \leq j \leq A$) for each of the A frames, falls between (i) the first mean value and (ii) the second mean value, except that in a case where the first mean value and the second mean value are equal to each other, the mean value of the luminance of each of the plurality of sequences is caused to be equal to the first and second mean values.

20. The display device driving method according to claim 18, wherein:

at least one of the regions is caused to include the arrangement pattern in which Q=0.

21. The display device driving method according to claim 18, wherein:

in at least one of the regions, A/2 is an even number of 2 or greater.

22. The display device driving method according to claim 21, wherein:

at least one of the regions is caused to include the arrangement pattern including first pixels changing their respective luminances in respective sequences that are shifted from each other in the luminance change pattern along the time axis direction by A/2 frames.

23. The display device driving method according to claim 18, wherein:

in at least one of the regions, (i) the plurality of sequences are two sequences, and (ii) for each frame, a positive-polarity data signal is written to a first pixel changing its luminance in a first one of the two sequences, and a negative-polarity data signal is written to a first pixel changing its luminance in a second one of the two sequences.

24. The display device driving method according to claim 18, wherein:

in at least one of the regions, (i) the array direction is the column direction, (ii) the plurality of sequences are two sequences that satisfy X=2, and (iii) for each frame, a first pixel having a positive write polarity and a first pixel having a negative write polarity are arranged alternately, and first pixels sharing an identical write polarity are connected to a single data signal line.

25. The display device driving method according to claim 18, wherein:

in at least one of the regions, A multiplied by one frame period yields a length that is (i) longer than 1/70 second and (ii) shorter than 1/30 second multiplied by a number of the plurality of sequences included in the arrangement pattern.

26. The display device driving method according to claim 18, wherein:

in at least one of the regions, a number of the plurality of sequences is A/2 raised to an R-th power (where R is a positive integer).

27. The display device driving method according to claim 18, wherein:

X is an even number.

28. The display device driving method according to claim 18, wherein:

a period of 2X frames is repeated at 24 Hz or higher.

29. The display device driving method according to claim 18, wherein:

in at least one of the regions, the arrangement pattern includes, for each frame, (i) a first group of first pixels each changing its luminance in a sequence, the first group having a write polarity, and (ii) a second group of first pixels each changing its luminance in the sequence for the first group, the second group having a write polarity different from the write polarity for the first group, the first pixels in the first group being equal in number to the first pixels in the second group.

30. The display device driving method according to claim 18, wherein:

in at least one of the regions, the arrangement pattern includes, for each frame, (i) a third group of first pixels, the third group having a data color and a write polarity, and (ii) a fourth group of first pixels, the fourth group having the data color for the third group and a write polarity different from the write polarity for the third group, the first pixels in the third group being equal in number to the first pixels in the fourth group.

31. The display device driving method according to claim 18, wherein:

the luminance change pattern is in a form of a rectangular wave.

32. The display device driving method according to claim 18, wherein:

the luminance change pattern is in a form of a triangular wave.

33. The display device driving method according to claim 18, wherein:

the luminance change pattern is in a form of a sine wave.

34. The display device driving method according to claim 18, wherein:

the luminance change pattern is in a form of a trapezoid wave.

* * * * *